United States Patent [19]

Grisham, Jr.

[11] 4,365,297
[45] Dec. 21, 1982

[54] INDUSTRIAL CONTROL SYSTEM WITH DISTRIBUTED COMPUTER IMPLEMENTED LOGIC

[75] Inventor: James S. Grisham, Jr., Arlington, Tex.

[73] Assignee: Forney Engineering Company, Carrollton, Tex.

[21] Appl. No.: 221,328

[22] Filed: Dec. 29, 1980

[51] Int. Cl.³ .......................... G06F 9/40; G06F 7/00; G06F 15/16; G06F 15/46
[52] U.S. Cl. .................................................. 364/200
[58] Field of Search .............................. 364/200 MS

[56] References Cited

U.S. PATENT DOCUMENTS

| | | | |
|---|---|---|---|
| 3,363,234 | 1/1968 | Erickson et al. | 364/200 |
| 3,413,612 | 11/1968 | Brooks et al. | 364/200 |
| 3,432,813 | 3/1969 | Annunziata | 364/200 |
| 3,665,487 | 5/1972 | Campbell et al. | 364/200 |
| 3,810,101 | 5/1974 | Avery | 364/200 |
| 4,161,027 | 7/1979 | Russell | 364/200 X |
| 4,177,514 | 12/1979 | Rupp et al. | 364/200 |
| 4,253,148 | 2/1981 | Johnson et al. | |

*Primary Examiner*—Harvey E. Springborn
*Attorney, Agent, or Firm*—Marvin A. Naigur; John E. Wilson; Richard L. Aitken

[57] ABSTRACT

An industrial control system is disclosed in which various on/off or other binary functions of an industrial process are each controlled by a separate single board computer. Each single board computer is provided with a simplified system whereby the user can interconnect a logic system between input ports and output ports of the computer to control the setting of the binary data at the output ports in accordance with the selected logic system in response to the data applied to the input ports with the output ports being connected to control the on/off and binary functions in the system. The logic functions are implemented in each single board computer by use of an applications program and a patch panel program. In the applications program, the system responds to input data in a flag memory and sets output flags in the flag memory in accordance with each possible logic function that might be used in the system. In the patch panel portion of the program, the input flags are set and the data at the I/O ports are set in accordance with connection specified by the storing of specific addresses in a patch panel memory.

8 Claims, 14 Drawing Figures

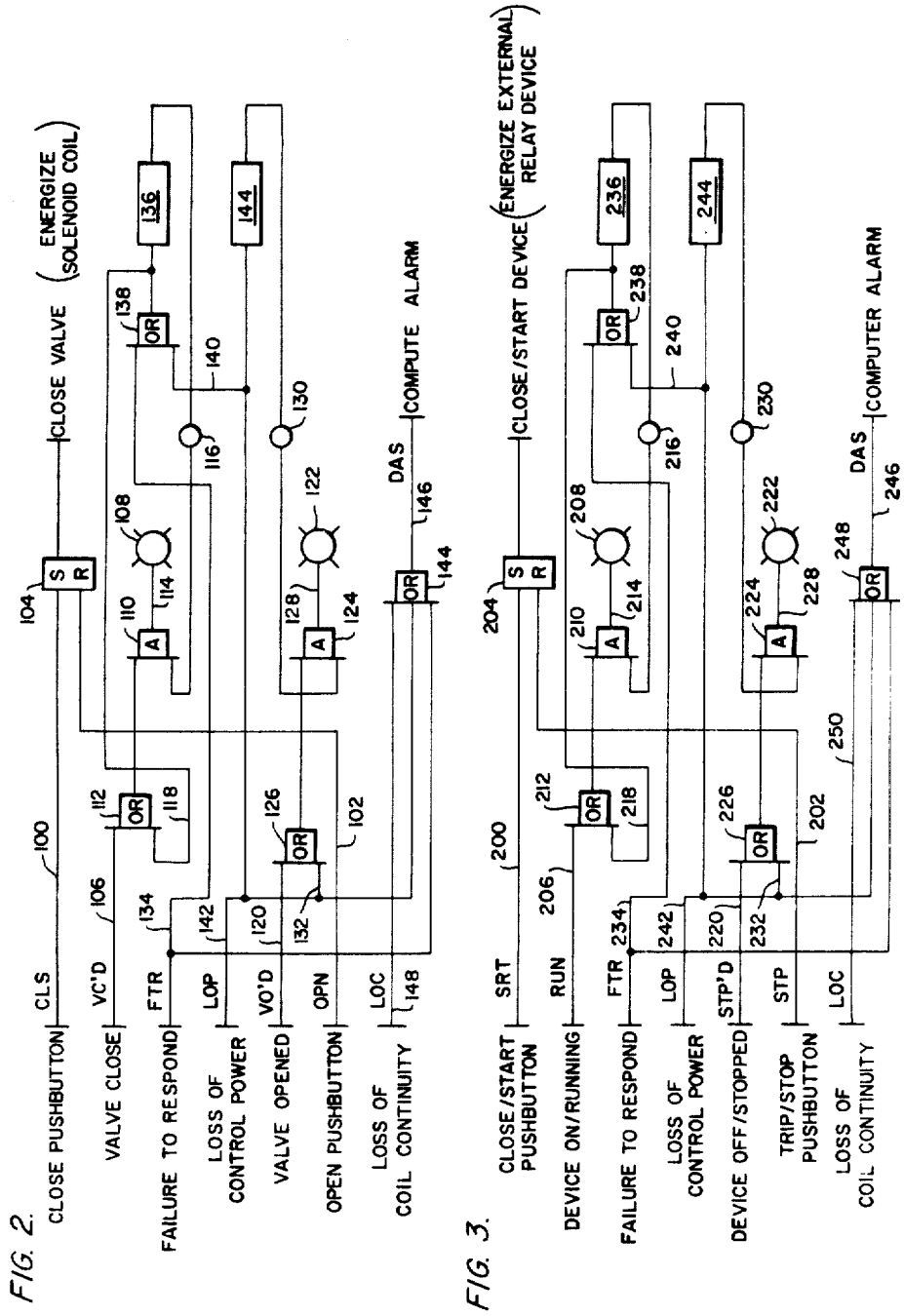

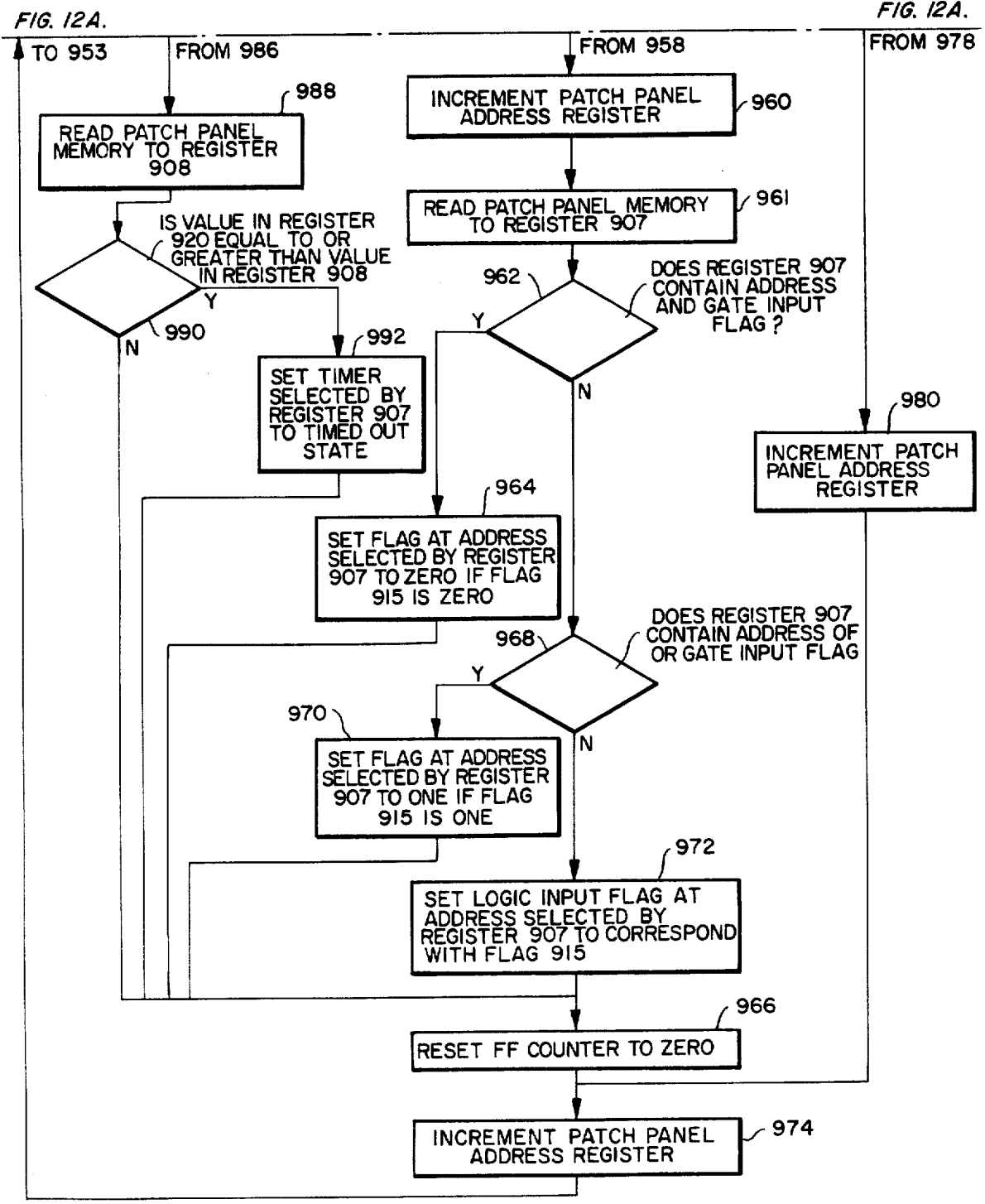

INDUSTRIAL CONTROL SYSTEM WITH DISTRIBUTED COMPUTER IMPLEMENTED LOGIC

BACKGROUND OF THE INVENTION

The present invention relates to industrial control systems that employ a large number of controlled devices and, more particularly, to industrial control systems which utilize a single board computer (SBC) associated with and for controlling each controlled device.

Many system-type industrial installations, for example, power generating stations, employ a large number of controlled devices for effecting coordinated operation of the overall system. These controlled devices include, for example, motors, pumps, compressors, various types of electrically operated valves, transmissions, instruments, solenoids, relays, and the like. Each of these controlled devices has a particular set of logic functions or control signals and/or command sequences that must be effected to ensure proper device operation. These logic function signals and command sequences include, for example, enable signals, stand-by signals, turn-on signals, turn-off signals, run-up and run-down sequences, time delays, emergency stop signals, and various alarm condition signals.

In the past, coordinated control of the various devices has been achieved by manual operation and various types of semi-automatic and automatic control systems including electromagnetic relay systems, hard-wired solid-state logic systems, computer control systems in which the controlled devices are connected to and controlled from a central computer and, more recently, distributed computer control systems in which a single board computer is connected to each controlled device with each computer having a program dedicated to the particular controlled device.

While both types of computer-oriented control systems, that is, the central computer arrangement and the distributed computer arrangement, provide effective system control, a number of drawbacks are associated with the introduction of computer control within a control system.

In a large control system, e.g., a control system for a power generating installation, a substantial programming effort must be undertaken to provide software for each of the controlled devices within the system. In installations using a large central computer, this programming effort is lessened somewhat by the ready availability of sophisticated high-level program languages that permit a relatively unskilled system controller to structure the necessary control programs. These sophisticated languages oftentimes include subroutines, e.g., query prompters and graphic display subroutines, that assist and guide the system control personnel in structuring the programs.

On the other hand, single board computers are generally programmed in low-level assembly-type languages or machine language codes, and, as a consequence, many system users are reluctant to employ distributed single board computers because of the difficulty in obtaining or training personnel to program the computers. As a practical consequence, system users employing single board computers are dependent upon their computer suppliers or other consultants for these control programs.

Other drawbacks that are associated with distributed single board computer systems are that maintenance personnel, who are usually trained in programming, must have a large inventory of preprogrammed single board computers with which to conduct "remove and replace" type troubleshooting. Also, the replacement of a defective controlled device with an updated or modified replacement oftentimes requires that the control program within the associated control computer be modified toreflect the updated or modified control function and/or command sequence logic of the replacement device.

The time and cost problems associated with developing a control system having a large number of controlled devices with a single board computer for each device does not normally prevent this type of system from being used in newly designed industrial systems. However, the same time and cost factors can prevent, or at least inhibit, cost effective retrofitting of existing industrial installations with dedicated single board computers because of the time required to identify the logic control functions and control sequences of operating equipment and the downtime that may be required to prepare and test a dedicated program for each single board computer.

In the system disclosed in the copending application Ser. No. 37,189 filed May 8, 1979, now U.S. Pat. No. 4,253,148, an industrial control system having a plurality of controlled devices is provided with a single board computer connected to each device through an input-/output interface. Each computer is controlled by a master or composite program that includes program steps adapted to achieve control and monitoring of all possible logic control functions and command sequences that exist within the system. A user alterable interconnection device (UAID) allows only those portions of the master program that relate to the logic control functions and/or control sequences of a particular controlled device to be operatively connected with the input/output ports associated with that device. As the single board computer continuously and successively loops through the master program, only those program steps that relate to the logic control functions and/or control sequences for the controlled device are operative, as determined by the UAID, to effect control and monitoring of the controlled device.

Once the logic control functions and command sequences for the various diverse controlled devices of a particular control system, for example, for a power generating plant, are established, only one master program is written to include all the logic control functions and command sequences for all the possible controlled devices within the system. The user alterable interconnection device may then be conveniently configured for each controlled device in a simple, straight-forward manner to easily adapt each single board computer to a particularly controlled device.

Each single board computer includes a central processor and its associated support circuitry, a programmable peripheral interface device (PPI) for interfacing the processor with a data highway and a central, supervisory computer, a program memory store that contains the master program (which is common to all the computers within the system), and a user alterable interface device (UAID) in the form of a field programmable read-only-memory (PROM) for operatively interconnecting those selected portions of the master program that relate to a particular controlled device with the input/output ports of that device.

Each master program for a particular control system includes sequentially arranged instructions which are designed to effect the various logic control functions and command sequences for every controlled device within the system. These instructions can cause the processor to, for example, query one or more input ports to determine the status of various sensor switches, query power lines to determine the presence or absence of power, perform various logical and computational operations, supply command signals to various output ports to effect control, and the like. The UAID is assigned a predetermined block of the available memory addresses, these addresses being termed "fictitious addresses". As the master program loops the central processor, operating in an indirect programming mode, it looks or refers to the UAID address for its input/output information. In single board computers that have not been adapted to a particular controlled device, each of the UAID addresses contain a nonfunctional address such as a preselected spare address or nonexistant address. In a single board computer that has been dedicated to a particular controlled device, selected locations within the UAID that relate to a particular logic control function and/or command sequence for the controlled device are provided with the actual addresses of the input/output ports associated with that device. As the master program loops, the portions of the master program that relate to or correspond to the logic control functions and/or command sequences of a particular controlled device address UAID locations that contain the actual addresses of the input/output ports of the controlled devices. In order to dedicate a single board computer to a particular device, all that is necessary is that the particular logic control function and/or command sequences for the device be identified and that the particular addresses within the UAID that relate to the so-identified portions of the program be provided with the actual input/output addresses of the program be provided with the actual input/output addresses of the controlled device.

In an average or representative application, it is contemplated that the master program may address upwardly of several hundred addresses within a UAID and only a few, perhaps 1–20%, of the available UAID addresses will contain actual input/output address information. Thus, the master program will continuously address a large number of UAID addresses and be operatively connected with only a few actual input/output ports selected by the UAID for the particular controlled device.

SUMMARY OF THE INVENTION

The system of the present invention is an improvement of the system disclosed in application Ser. No. 37,189. In the system of the present invention, like that of the above mentioned copending application, each single board computer includes sequentially arranged instructions which are designed to effect all of the various logic functions and command sequences for every control device which might be found within the system. However, instead of the instructions which effect the functions referring to UAID addresses in a PROM, these instructions refer to address locations in a random access flag memory. Each set of instructions which effect a logic function will look at one or more logic input flags in the random access memory, perform logic operations on the data stored at those flags and set logic output flags in the random access memory. Each logic function will have at least one input flag and one output flag. This portion of the program is called the applications portion of the program. In a separate subroutine of the instruction sequence called the patch panel portion of the program, the instruction sequence sets the logic input flags in the random access flag memory and sets output conditions at I/O ports in accordance with directions received from a patch panel memory.

The patch panel memory is a field programmable read only memory (PROM), which is configured so that each memory location has a FROM section and a TO section. The user of the system decides which I/O port inputs he wants to connect to which logic inputs, which logic outputs he wants to connect to which I/O port outputs and which logic outputs he wants to connect to which logic inputs. He then enters the addresses of these I/O ports and of the logic flags corresponding to the selected logic inputs and outputs in TO and FROM sections of successive memory locations in the patch panel memory. To effect a connection from point A to point B, he places the address of point A in the FROM section and the address of point B in the TO section.

In the patch panel portion of the program, the instruction sequence sets logic input flags in accordance with the status of the I/O input ports and logic output flags as directed by the connections specified in the patch panel memory and sets I/O output ports in accordance with the logic output flags also as directed by the connections specified in the patch panel memory. The program will then repeatedly cycle through the patch panel subroutine of the program and then through the applications instruction sequence of the program and, in this manner, the I/O ports will be set in accordance with the logic interconnections as directed by the connections specified in the patch panel memory. The program will continue to cycle through all the possible functions of the system and those which are not used will merely control the status of logic function output flags in the flag memory which are not specified to be connected to an input in the patch panel memory and, accordingly, will have no effect on the control of the output of the system.

A further feature of the present invention is that each AND gate function and each OR gate function will have only one input flag even though each OR gate and each AND gate logic function may have any number of inputs. Each patch panel memory location which directs a connection to the input of an AND gate or OR gate will have in its TO section the address of the single input flag of the OR gate or AND gate. The program will initially set all of the single input flags for each OR gate function to zero. If any of the input points directed by the patch panel memory to be connected to an input of an OR gate is a one, the patch panel subroutine will set the OR gate input flag to one. Thus, the OR gate input flag will be set to one if any one of the inputs specified to be connected to the input of the OR gate by the patch panel program is a one and will remain a zero only if all of the inputs specified to be connected to the input of the OR gate are zero. Similarly, the program initially sets the single input flag for each AND gate logic function to one and then will set this flag to zero if there is a zero in any of the inputs specified in the patch panel memory to be connected to the input of the AND gate function. Accordingly, each AND gate flag will remain a one if, and only if, all of the inputs which are specified in the patch panel memory to be connected to an input of this AND gate are ones and will be set back to zero if any of these inputs are at zero.

This improved system has all of the advantages of the system described in copending application Ser. No. 37,189 and, in addition, by using the patch panel memory to control the setting of the input flags to the logic functions and to control the setting of the I/O output ports in accordance with the logic output flags, facilitates configuration of the control system by the user for the particular control logic functions that he wants to perform. The user merely thinks in terms of connecting input ports to the inputs of logic functions, output ports to the outputs of logic functions and also the outputs of logic functions to the input of other logic functions and specifies addresses in the FROM and TO sections of the patch panel memory locations in accordance with the connections that he desires to make. The program will then carry out the logic functions and control the output in accordance with the connections specified by the user.

BRIEF DESCRIPTION OF THE DRAWINGS

The above brief description as well as the objects, features, and advantages of the present invention will be more fully appreciated by reference to the following detailed description of the present invention, when taken in connection with the accompanying drawings wherein:

FIGS. 2-7 are examples of logic diagrams which may be implemented by single board computers of the system;

FIGS. 12a and 12b depict a flow chart illustrating the program employed in each of the single board computers to control the output devices in accordance with the logic functions selected by the user of the system.

DESCRIPTION OF THE PREFERRED EMBODIMENT

Figure 1:
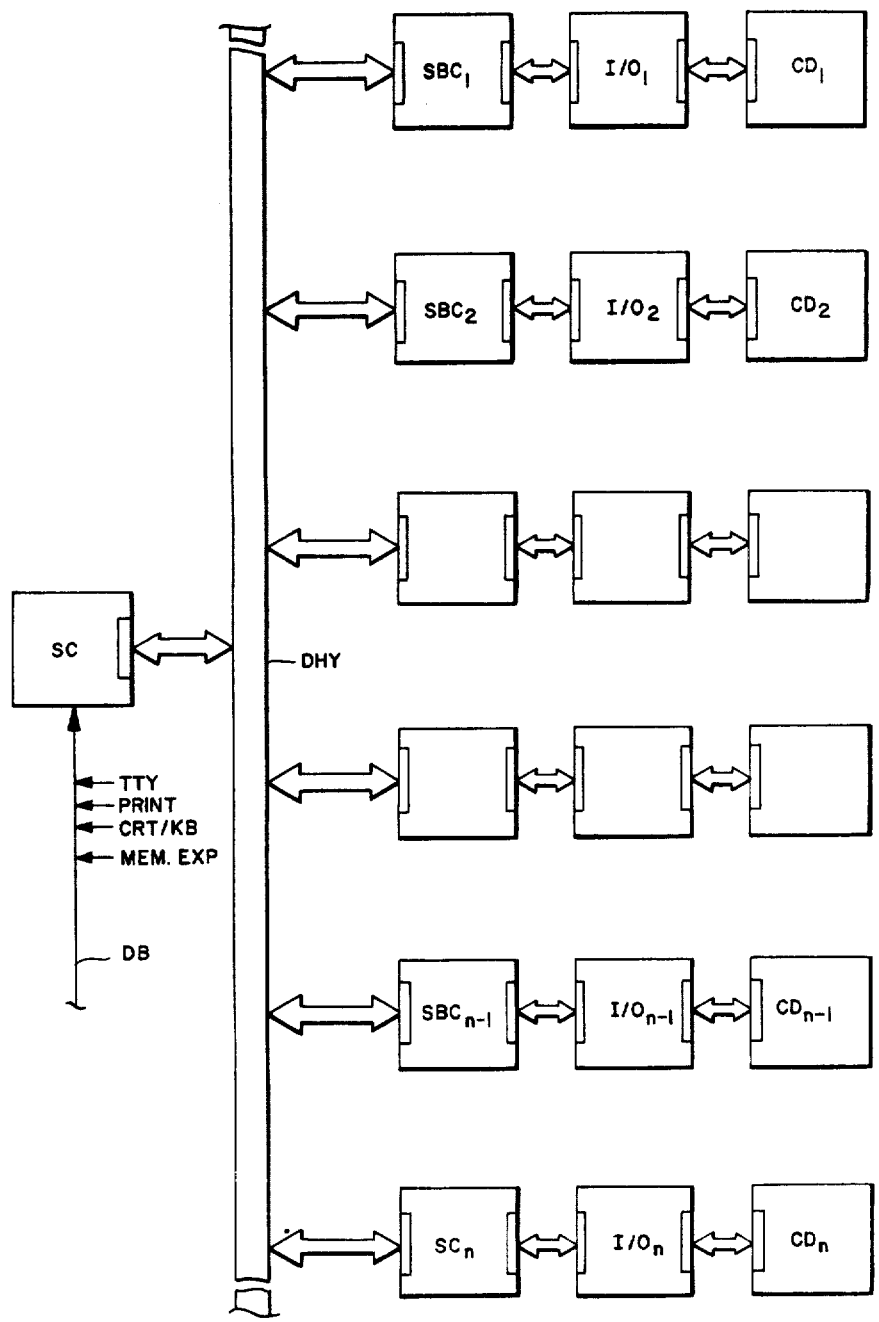
FIG. 1 is a schematic representation of the overall organization of an industrial control system in accordance with the present invention in which a plurality of controlled devices are connected to an associated single board computer through an input/output interface.

The architecture of a distributed processor industrial control system in accordance with the present invention, as shown in FIG. 1, includes a plurality of diverse controlled devices $CD_1$, $CD_2$, ... $CD_{n-1}$, $CD_n$ each of which is connected through an associated input/output board $I/O_1$, $I/O_2$, ... $I/O_{n-1}$, $I/O_n$ to a single board computer $SBC_1$, $SBC_2$, ... $SBC_{n-1}$, $SBC_n$ which are, in turn, interconnected through a bidirectional data highway or intercommunication buss DHY to a central, supervisory computer SC. An auxilliary data buss DB may be used to connect the supervisory computer SC to a teletype terminal, a printer, a CRT/keyboard terminal, another control system and/or additional memory. The control system of the preferred embodiment is designed as a plant auxilliary control system (PAC) for a power generating station. The devices normally found in a PAC system include, but are not limited to, motor-operated valves, fans, pumps, and compressors; relay-operated devices; solenoid-operated devices; and various types of electromagnetic actuators used to operate various types of valves and the like. The controlled devices also usually include various sensors, eg.g., limit switches or other transducers which monitor or determine the operating characteristics or state of the controlled device, which determine whether or not a device is open or closed, running or not running, functional or not functional, and which determine whether or not the electrical windings associated with the controlled device are continuous or interrupted.

Each controlled device has a particular set of logic control functions and/or command sequences that determine proper operation of the device. The logic diagrams for several exemplary controlled devices are shown in FIGS. 2-7. Each of these diagrams illustrates the various logic function operators or elements and their logical relationship or interconnections needed to effect device control and monitoring including the logic required to determine the operating for functional status of the controlled device, to initiate a command, to determine if the controlled device is responding as commanded, and determine the presence or absence of various malfunction and alarm conditions. Each of single board computers $SCB_1$, $SBC_2$, ... $SBC_{n-1}$, and $SBC_n$ may be conditioned by the user to function as depicted in any one of the logic diagrams shown in FIGS. 2-7 within the capacity of the system which the user desires to implement.

The logic diagram of FIG. 2 represents the basic logic function operations and control sequences for a single coil, solenoid-operated valve in which the valve is closed when the solenoid coil (not shown) is energized and the valve is opened when the coil is de-energized.

The 'close valve' and 'open valve' input signals CLS and OPN are provided, respectively, on lines 100 and 102 which are connected, respectively, to the S and R inputs of RS latch 104. When a 'close valve' input signal CLS is provided on line 100, the RS latch 104 is set to provide an output command signal to energize the solenoid coil and close the valve, and when an 'open valve' input signal OPN is provided on line 102, the RS latch 104 is reset to de-energize the solenoid coil.

A 'valve is closed' indication signal VC'D is provided by an appropriate switch or sensor (not shown) on line 106 and is used to actuate a valve closed indicator 108 through an AND gate 110 and an OR gate 112. The indicator 108 receives its valve closed actuation signal along line 114 from the AND gate 110 which receives the output of the OR gate 112 and the complement of the inclusive OR result of a 'failure to respond' warning signal FTR and a 'loss of power' warning signal LOP provided through complementing operator 116. The OR gate 112 receives the 'valve is closed' indication signal VC'D along line 106 and the inclusive OR result of the 'failure to respond' warning signal FTR and the 'loss of power' warning signal LOP provided on line 118.

A 'valve is open' indication signal VO'D is provided by an appropriate switch or sensor (not shown) on line 120 and is used to actuate a valve opened indicator 122 through an AND gate 124 on an OR gate 126. The indicator 122 receives its valve opened actuatio signal along line 128 from the AND gate 124 which receives the output of the OR gate 126 and the complement of the 'loss of power' warning signal LOP provided through complementing operator 130. The OR gate 126 receives the 'valve is open' indication signal VO'D along line 120 and the 'loss of power' warning signal LOP provided on line 132.

The 'failure to respond' warning signal FTR on line 134 and the 'loss of power' warning signal LOP on line 142 are both connected to the input of OR gate 138. The output of the OR gate 138 is connected to the input of OR gate 112 along line 118 and to a flasher unit 136 which, when actuated, provides a periodically interrupted output signal through complementary operator 116 to AND gate 110 and the indicator 108. The 'loss of power' warning signal LOP on line 142 is connected directly to a flasher unit 144 which, when actuated, provides a periodically interrupted output signal through the complementing operator 130 to the AND gate 124 and the indicator 122.

A 'computer alarm' indication DAS is provided along line 146 from the output of an OR gate 144 which receives, as its inputs, the 'loss of power' warning signal LOP from line 142, the 'failure to respond' warning signal FTR from line 134, and a 'loss of continuity' warning signal LOC along line 148.

When a 'close valve' input signal or an 'open valve' input signal, CLS or OPN, is provided, respectively, on line 100 or 102, the RS latch 104 is set or reset to provide an output command signal to energize or de-energize the solenoid coil and close or open the valve. When the valve reaches its closed or open position, the indicators 108 or 122 provide the proper indication thereof, and, should a failure to respond or a loss of power condition arise, the appropriate indicator 108 and/or 122 is actuated to provide a flashing indication. In addition, a computer alarm is provided should there be a failure to respond, a loss of power, or a loss of coil continuity condition detected.

The logic diagram of FIG. 3 represents the basic logic function operations and control sequences for a relay-operated device in which the device is started when the relay is closed and the device is stopped when the relay is tripped to its open position.

The 'device start' and 'device stop' input signals SRT and STP are provided, respectively, on lines 200 and 202 which are connected, respectively, to the S and R inputs of RS latch 204. When a 'device start' input signal SRT is provided on line 200, the RS latch 204 is set to provide an output command signal to energize the relay coil (not shown) and start the controlled device, and when a 'device stop' input signal STP is provided on line 202, the RS latch 204 is rest to de-energize or trip the relay open.

A 'device is running' indication signal RUN is provided by an appropriate sensor (not shown) one line 206 and used to actuate a device-running indicator 208 through an AND gate 210 and an OR gate 212. The indicator 208 receives its device running actuation signal along line 214 from the AND gate 210 which receives the output of the OR gate 212 and the complement of the inclusive OR result of a 'failure to respond' warning signal FTR and a 'loss of power' warning signal LOP provided through complementing operator 216. The OR gate 212 receives the 'device is running' indication signal RUN along line 206 and the inclusive OR result of the 'failure to respond' warning signal FRT and the 'loss of power' warning signal LOP along line 218.

A 'device is stopped' indication signal STP'D is provided by an appropriate sensor (not shown) on line 220 and used to actuate a device-stopped indicator 222 through an AND gate 224 and an OR gate 226. The indicator 222 receives its device-stopped actuation signal along line 228 from the AND gate 224 which receives the output of the OR gate 226 and the complement of the 'loss of power' warning signal LOP provided through complementing operator 230. The OR gate 226 receives the 'device is stopped' indication signal STP'D along line 220 and the 'loss of power' warning signal LOP along line 232.

The 'failure to respond' warning signal FTR on line 234 and the 'loss of power' warning signal LOP on line 242 are both connected to the input of OR gate 238. The output of the OR gate 238 is connected to the input of OR gate 212 along line 218 and to a flasher unit 236 which, when actuated, provides a periodically interrupted output signal through complementary operator 216 to AND gate 210 and the indicator 208. The 'loss of power' warning signal LOP on line 242 is connected directly to a flasher unit 244 which, when actuated, provides a periodically interrupted output signal through complementing operator 230 to the AND gate 224 and the indicator 222.

A 'computer alarm' indication DAS is provided along line 246 from the output of an OR gate 248 which receives, as its inputs, the 'loss of power' warning signal LOP from line 242, the 'failure to respond' warning signal FTR from line 234, and a 'loss of continuity' warning signal LOC along lien 250.

When a 'device start' input signal or a 'device stop' input signal, SRT or STP, is provided, respectively, on line 200 or line 202, the RS latch 204 is set or reset to close or trip open the relay and start or stop the controlled device. When the device is in its run or stop modes, the indicator 208 or 222 provides the proper indication thereof, and, should a failure to respond condition or a loss of power condition arise, the appropriate indicator 208 and/or 222 is actuated to provide a flashing indication. In addition, a computer alarm is provided should there be a failure to respond, a loss of power, or a loss of coil continuity condition detected.

Figure 4:
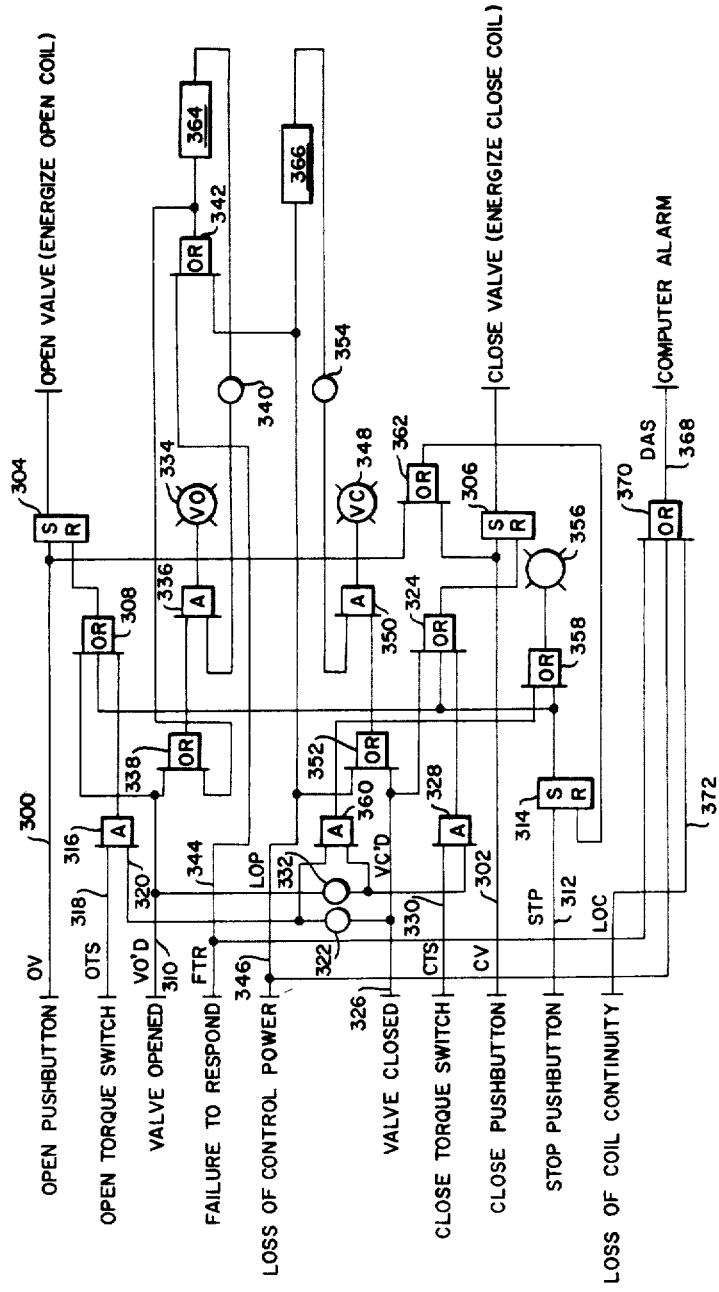

FIG. 4 illustrates a logic diagram for a motor operated valve (not shown) which is actuated to its open or closed position by selectively energizing and latching an open coil or energizing and latching a close coil.

The 'open valve' input signal OV and the 'close valve' input signal CV are provided, respectively, along lines 300 and 302 that are connected, respectively, to the S inputs of RS latches 304 and 306. The outputs of these two latches are connected to and adapted to provide output command signals to energize and latch, respectively, the open coil and the close coil of the controlled valve. The R input of the RS latch 304 is connected to an OR gate 308 which resets the RS latch 304 when a 'valve is open' indication signal VO'D is received from line 310, a 'stop' input signal STP is received from line 312 through an RS latch 314, and a signal from AND gate 316 which provides an output when coincidence occurs between an 'open torque switch' indication signal OTS along line 318 and the complement of a 'valve is closed' indication signal VC'D provided on line 320 through a complementing operator 322. The R input of the RS latch 306 is connected to an OR gate 324 which resets the RS latch 306 when a 'valve is closed' indication signal VC'D is received from line 326, the 'stop' input signal STP on line 312 from RS latch 314, and/or a signal from AND gate 328 which provides an output when coincidence occurs between a 'close torque switch' indication signal CTS along line 330 and the complement of the 'valve is open' indication signal VO'D provided from line 310 through complementing operator 332.

The 'valve is opened' indication signal VO'D is provided on line 310 from a suitable sensor (not shown) and used to actuate a valve opened indicator 334 through an AND gate 336 and an OR gate 338. The indicator 334 receives its valve opened actuation signal from the AND gate 336 which receives the output of the OR gate 338 and the complement of the inclusive OR result of the 'failure to respond' warning signal FTR and the 'loss of power' warning signal LOP through complementing operator 340. The OR gate 338 receives the 'valve is opened' indication signal VO'D along line 310 and another signal from OR gate 342 that is the inclusive OR result of the 'failure to respond' warning signal FTR provided on line 344 and the 'loss of power' warning signal LOP provided on line 346.

A 'valve is closed' indication signal VC'D is provided from a appropriate switch or sensor (not shown) on line 326 and is used to actuate a valve closed indicator 348 through an AND gate 350 and an OR gate 352. The indicator 348 receives its valve closed actuation signal fro the AND gate 352 and the complement of the 'loss of power' indication signal LOP through a complementing operator 354. The Or gate 352 receives the 'valve is closed' indication signal VC'D along line 326 and the 'loss of power' indication signal LOP from line 346.

The 'stop' input signal STP is provided on the line 312 and used to actuate a stop indicator 356 through an OR gate 358 and the RS latch 314. The indicator 356 receives its signal from the OR gate 358 which receives an output signal from the RS latch 314 when the latch is set by the stop signal STP on line 312 and a signal from AND gate 360 which provides a signal when coincidence occurs between the complement of the 'valve is closed' indication signal VC'D provided by complementing operator 322 and the complement of the 'valve is opened' indication signal VO'D provided by the complementing operator 332. The RS latch 314 is reset by appropriate signal from the OR gate 362 which provides the inclusive OR result of the 'close valve' input signal CV from line 302 and the 'open valve' input signal OV from line 300.

The 'failure to respond' warning signal FTR on line 344 and the 'loss of power' warning signal LOP on line 346 are both connected to the input of OR gate 342. The output of the OR gate 342 is connected to the input of OR gate 338 and to a flasher unit 364 which, when actuated, provides a periodically interrupted output signal through complementary operator 340 to AND gate 336 and the indicator 334. The 'loss of power' warning signal LOP on line 346 is connected directly to a flasher unit 336 which, when actuated, provides a periodically interrupted output signal through the complementing operator 354 to the AND gate 350 and the indicator 348.

A 'computer alarm' indication DAS is provided along line 368 from the outputof an OR gate 370 which receives, as its inputs, the 'loss of power' warning signal LOP from line 346, the 'failure to respond' warning signal FTR from line 344, and a 'loss of continuity' warning signal LOC along line 372.

When an 'open valve' input signal OV is provided on line 300, the RS latch 304 is set to provide an output command signal to energize the open coil. When the valve reaches its open position, the 'valve is open' indication signal VO'D on line 310 is passed through OR gate 308 to reset the RS latch 304 to de-energize the open coil, the valve thereafter being latched in its open position. When a 'close valve' input signal CV is provided on line 302, the RS latch 306 is set to provide an output command signal to energize the close coil. When the valve reaches its closed position, the 'valve is closed' indication signal VC'D on line 326 through the OR gate 324 acts to reset the RS latch 306 and de-energize the close coil, the valve being thereafter latched in the closed position.

Figure 5:
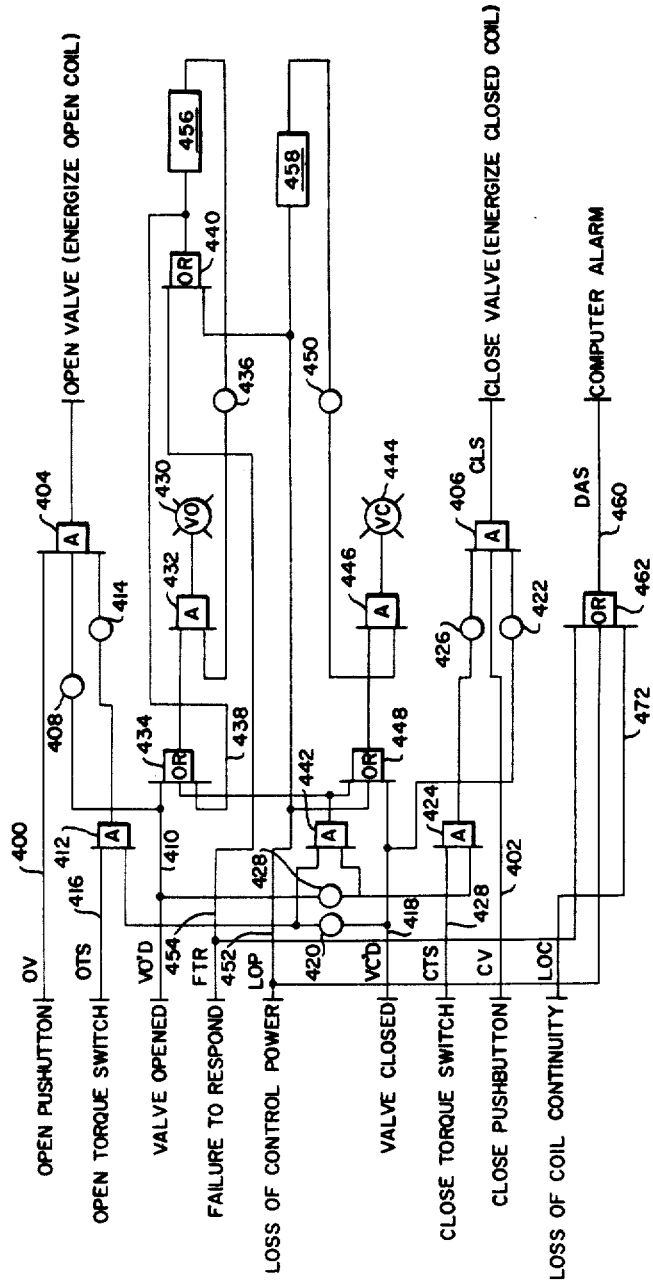

FIG. 5 illustrates a logic diagram for a motor-operated valve (not shown) which is actuated toward and to its open or closed position by energizing a valve open coil or energizing a valve close coil.

The 'open valve' input signal OV and the 'close valve' input signal VC are provided, respectively, along lines 400 and 402 which are connected, respectively, to the inputs of AND gates 404 and 406.

The AND gate 404 provides an output command signal to energize the open coil of the valve when coincidence occurs between the 'open valve' input signal OV on line 400, the complement of the 'valve is opened' indication signal VO'D provided through a complementing operator 408 from line 410, and the complement of the output of AND gate 412 provided through a complementing operator 414. The AND gate 412 provides an output when coincidence occurs between an 'open torque switch' warning signal on line 416 and the complement of the 'valve is closed' indication signal VO'D provided on line 418 through complementing operator 420.

The AND gate 406 provides an output to energize the close coil of the valve when coincidence occurs between the 'close valve' command signal CV on line 402, the complement of the 'valve is closed' indication signal VC'D from line 418 through complementing operator 422, and the complement of the output of AND gate 424 provided through complementing operator 426. The AND gate 424 provides an output when coincidence occurs between the 'closed torque switch' warning signal CTS on line 428 and the complement of the 'valve is opened' indication signal BO'D from line 410 provided through complementing operator 428.

The 'valve is opened' indication signal VO'D provided on line 410 from a suitable sensor is used to actuate a valve opened indicator 430 through an AND gate 432 and an OR gate 434. The indicator 430 receives its valve opened actuation signal from the AND gate 342 which provides an output when coincidence occurs between the output of the OR gate 343 and the complement of inclusive OR result of the 'failure to respond' warning signal FTR and the 'loss of power' warning signal LOP provided through complementing operator 436. The OR gate 343 receives the 'valve is opened' indication signal VO'D along line 410, a signal along line 438 which is the inclusive OR result of the 'loss of power' warning signal LOP and the 'failure to respond' warning signal FTR provided through OR gate 440, and another signal from the output of AND gate 422. This last logical operator provides an output when coincidence occurs between the complement of the 'valve is closed' indication signal VC'D from line 418 provided through complementing operator 420 and the complement of the 'valve is opened' indication signal VO'D from line 410 provided through complementing operator 428.

The 'valve is closed' indication signal VC'D provided on line 418 is used to actuate a valve closed indicator 444 through an AND gate 446 and an OR gate 448. The indicator 444 receives its valve closed actuation signal from the AND gate 446 which receives the output of the OR gate 448. The AND gate 446 provides an output indication when coincidence occurs bertween the complement of the 'loss of power' indication signal LOP provided through a complementing operator 450 and the output of the OR gate 448. This latter logical operator receives the 'valve is closed' indication signal VC'D along line 418, the 'loss of power' warning signal LOP from line 452, and another signal from the output of the AND gate 442, the inputs of which are described above in connection with the operation of the valve opened indicator 430.

The 'failure to respond' warning signal FTR on line 454 and the 'loss of power' warning signal LOP on line 452 are both connected to the input of OR gate 440. The output of the OR gate 440 is connected to the input of OR gate 434 along line 438 and to a flasher unit 456 which, when actuated, provides a periodically interrupted output signal through complementary operator 436 to AND gate 432 and the indicator 430. The 'loss of power' warning signal LOP on line 452 is connected directly to a flasher unit 458 which, when actuated, provides a periodically interrupted output signal through complementing operator 450 to the AND gate 446 and the indicator 444.

A 'computer alarm' indication DAS is provided along line 460 from the output of an OR logical operator 462 which provides the inclusive OR result of the 'loss of power' warning signal LOP from line 452, the 'failure to respond' warning signal FTR from line 454, and a 'loss of continuity' warning signal LOC from line 472.

Figure 6:
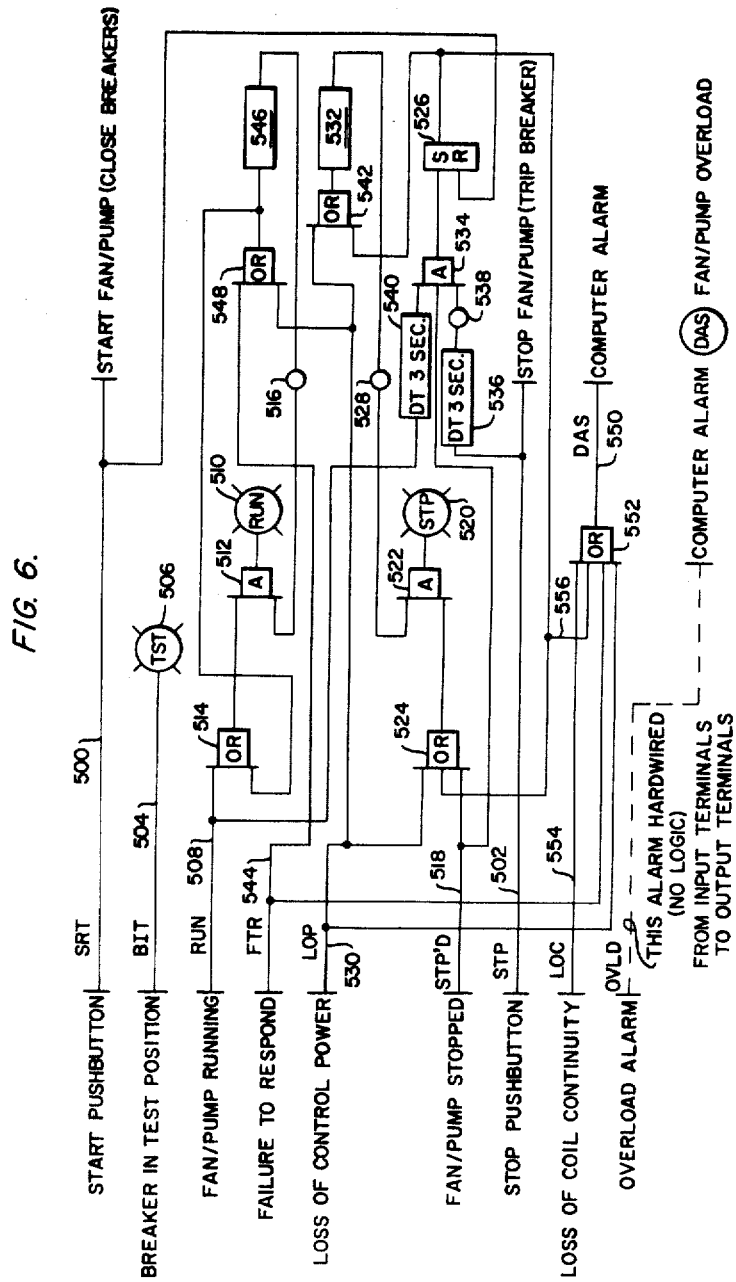

FIG. 6 illustrates a logic diagram for an electrically operated breaker in which the controlled device is energized by closing the breaker and de-energized by tripping the breaker open.

The 'start device' command signal SRT and the 'stop device' input signals for closing and tripping open the breaker are provided directly on lines 500 and 502. A 'breaker-in test' indication signal BIT is provided on line 504 to an indicator 506.

A 'device is running' indication signal RUN is provided on line 508 and is used to actuate an indicator 510 through an AND gate 512 and an OR gate 514. The indicator 510 receives its signal from the AND gate 512 when coincidence occurs between the output of the OR logical operator 514 and the complement of the inclusive OR result of the 'failure to respond' warning signal FTR and the 'loss of power' warning signal LOP provided through complementing operator 516. The OR gate 514 receives the 'device is running' indication signal RUN on line 509 and the inclusive OR output of OR logical operator 548.

A 'device is stopped' indication signal STP'D is provided on line 518 and is used to actuate an indicator 520 through an AND gate 522 and an OR gate 524. The indicator 520 receives its signal from the AND gate 522 when coincidence occurs between the output of the OR gate 524 and the complement of the inclusive OR result of the 'loss of power' warning signal LOP and the S output of an RS latch 526 provided through complementing operator 528. The OR gate 524 provides the inclusive OR result of the 'device is stopped' indication signal STP'D on line 518, the 'loss of power' warning signal LOP from line 530, and the S output of the RS latch 526.

The RS latch 526, in cooperation with an AND gate 534, is adapted to provide a warning indication signal if the controlled device, after being commanded to start, enters an uncommanded stop condition any time after the expiration of a three-second time delay period. The RS latch 526 has its S input connected directly to the output of the AND gate 534 and its R input connected directly to the 'start device' input line 500. The inputs of the AND gate 534 are connected to the 'device is running' line 508 through a three-second time delay gate 540, directly to the 'device is stopped' line 518, and to the 'stop device' input line 502 through a three-second time delay gate 536 and a complementing operator 538. When a 'start device' input signal SRT is provided on line 500, the RS latch 526 is reset. The time delay gates 540 and 536 then delay, respectively, the 'device is running' indication signal RUN and the 'stop device' command signal STP for a three-second period. At the expiration of this time period, these two signals are applied to the AND gate 534 by the respective time delay gates. If the controlled device is running, the absence of the 'device is stopped' indication signal STP'D prevents the AND gate 534 from providing an output to set the RS latch 526. Should the device enter an uncommanded stop condition, e.g., because of a controlled device malfunction, the presence of the 'device is stopped' indication signal STP'D, the presence of the complement of the 'stop device' input signal STP (which indicates that the device has not been commanded to stop), and the presence of the 'device is running' indication signal RUN (which will continue to be applied to the AND gate 534 for a three-second period by the time delay gate 540) will cause the AND gate 534 to set the RS latch 526 which then provides a warning indication signal through an OR gate 542, a flasher unit 532, a complementing operator 528, and an AND gate 552, described below.

The 'failure to respond' warning signal FTR on line 544 and the 'loss of power' warning signal LOP on line 530 are both connected to the input of OR gate 548. The output of the OR gate 548 is connected to the input of OR gate 514 and to the flasher unit 546 which, when actuated, provides a complementary operator 516 to the AND gate 512 and the indication 510. The 'loss of power' warning signal LOP on line 530 is connected through the OR gage 542 to the flasher unit 532 which, when actuated, provides a periodically interrupted output signal through interrupted output signal through complementing operator 528 to the AND gate 522 and the indicator 520.

A 'computer alarm' indication signal DAS is provided along line 550 from the output of the OR gate 552 which provides the inclusive OR results of a 'loss of continuity' warning signal LOC provided on line 554, the S output of the RS latch 526 provided on line 556, the 'failure to respond' warning signal FTR provided on line 544, and the 'loss of power' warning signal LOP provided from line 530.

Figure 7:
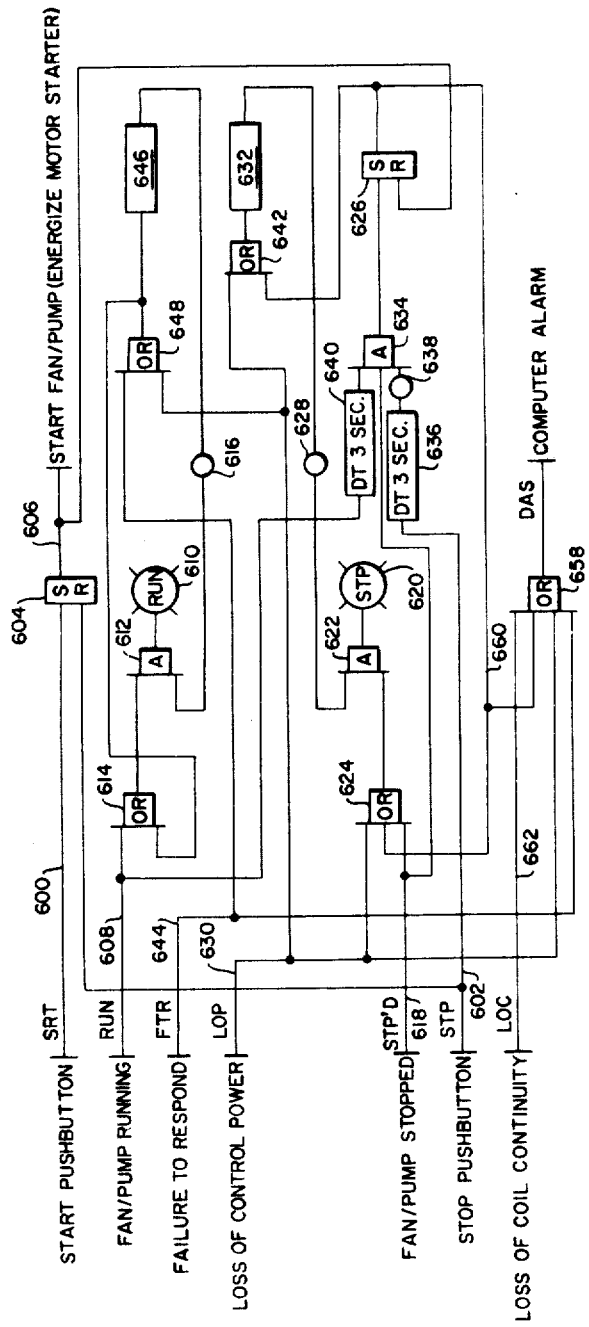

FIG. 7 illustrates the logic diagram for a motor starter for starting a motor driven device such as a fan, pump, or the like in which the device is started when the motor starter is energized.

The 'start' input signal SRT for energizing the motor starter and the 'stop' input signal STP for deenergizing the motor starter to stop the controlled device are provided, respectively, on lines 600 and 602 with these two commands being directed to the S and R inputs of an RS latch 604 which provides the output command signal to the motor starter on line 606.

A 'device is running' indication signal RUN is provided on line 608 and is used to actuate an indicator 610 through an AND gate 612 and an OR gate 614. The indicator 610 receives its actuation signal from the AND gate 612 when coincidence occurs between the output of the OR gate 614 and the complement of the inclusive OR result of a 'failure to respond' warning signal FTR and the 'loss of power' warning signal LOP provided thorugh complementing operator 616.

A 'device is stopped' indication signal STP'D is provided on line 618 and used to actuate an indicator 620 through an AND gate 622 and an OR gate 624. The indicator 620 receives its signal from the AND gate 622 when coincidence occurs between the output of the OR gate 624 and the complement of the inclusive OR result of the 'loss of power' warning signal LOP and the S output of an RS latch 626 provided through a complementing operator 628. The OR gate 624 provides the inclusive OR result of the 'device is stopped' indication signal on line 618, the 'loss of power' warning signal LOP from line 630, and the S output of the RS latch 626.

The RS latch 626, in cooperation with an AND gate 634, is adapted to provide a warning indication signal if the controlled device, after being commanded to start, enters an uncommanded stop condition any time after the expiration of a three-second time delay period. The RS latch 626 has its S input connected directly to the output of the AND gate 634 and its R input connected directly to the 'start' output line 606. The inputs of the AND gate 634 are connected to the 'device is running' line 608 through a three-second time delay gate 640, directly to the 'device is stopped' line 618, and to the 'stop device' input line 602 through a three-second time delay gate 636 and a complementing operator 638. When a 'start device' input signal SRT is provided on line 600, the RS latch 626 is reset. The time delay gates 640 and 636 then delay, respectively, the 'device is running' indication signal RUN and the 'stop device' command signal STP for a three-second period. At the expiration of this time period, these two signals are applied to the AND gate 634 by the respective time delay gates. If the controlled device is running, the absence of the 'device is stopped' indication signal STP'D prevents the AND gate 634 from providing an output to ser the RS latch 626. Should the device enter an uncommanded stop condition, e.g., because of a controlled device malfunction, the presence of the 'device is stopped' indication signal STP'D, the presence of the complement of the 'stop device' input signal STP (which indicates that the device has not been commanded to stop), and the presence of the 'device is running' indication signal RUN (which will continue to be applied to the AND gate 634 for a three-second period by the time delay gate 640) will cause the AND gate 634 to set the RS latch 626 which then provides a warning indication signal through an OR gate 642, and the AND logical operator 622 to the indicator 620 and a warning indication to an OR gate 658.

The 'failure to respond' warning signal FTR on line 644 and the 'loss of power' warning signal LOP on line 630 are both connected to the input of OR gate 648. The output of the OR gate 648 is connected to an input of OR gate 614 and to the flasher unit 646 which, when actuated, provides a periodically interrupted output signal through complementing operator 616 to AND gate 612 and the indicator 610. The 'loss of power' warning signal LOP on line 630 is connected through OR gate 642 to a flasher unit 632 which, when actuated, provides a periodically interrupted output signal through complementing operator 628 to the AND gate 622 and the indicator 620.

A computer alarm signal DAS is provided at the output of the OR gate 658 which provides the inclusive OR result of the 'failure to respond' warning signal FTR from line 644, the 'loss of power' warning signal LOP provided from line 630, the S output of the RS latch 626 provided on line 660, and a 'loss of continuity' warning signal LOC provided on line 662.

Figure 8A:
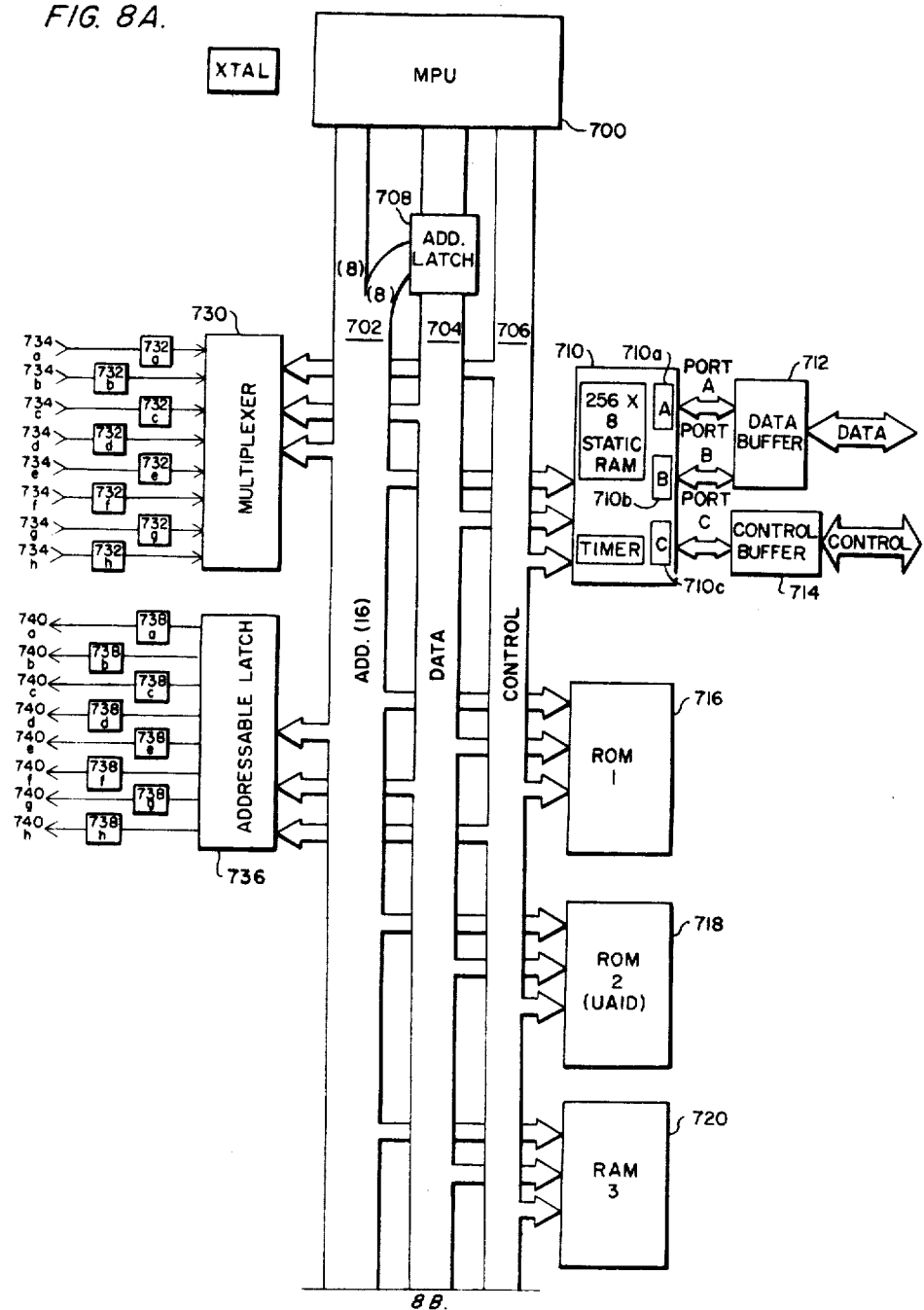
FIGS. 8A and 8B illustrate, in schematic form, the architecture of a single board computer suitable for use in accordance with the present invention.
Figure 8B:
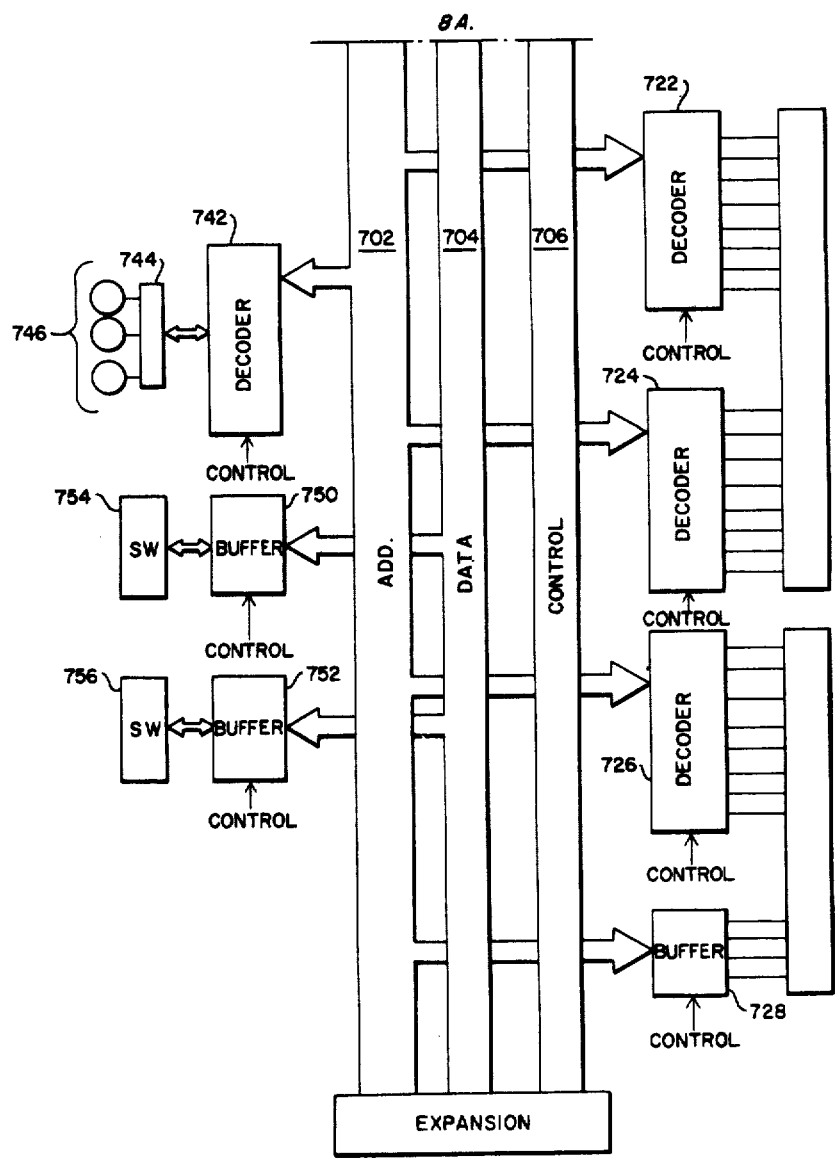

The overall organization of a single board computer suitable for use in accordance with the present invention is shown in FIGS. 8A and 8B. The particular computer illustrated is based on the Intel 8085 Microprocessor and its associated support IC's (integrated circuits) which provide a general purpose programmable computer. This processor, as is common with other general purpose MPU's, includes an arithmetic logic unit, an accumulator, flag storage register, program counter, stack pointer, and a plurality of user-accessible operating registers (B,C,D,E,H, and L); and is operable in various addressing modes including immediate, direct, indirect, and relative addressing modes. It is understood that the computer organization illustrated in FIGS. 8A and 8B is merely exemplary or representative of a large number of microprocessor-based single board computers that are suitable for use in accordance with the present invention and that the organization is schematic or representational in form, the actual interconnections and functional/control signal relationships of the various integrated circuits being known in the art as explained, e.g., in An Introduction to Microprocessors by Osborne, A. et al (Berkely, Calif., 1977) Vol. II, pp. 5-1 to 5-75; and the MSC-85 User's Manual published by the Intel Corporation, Sànta Clara, Calif.

The microprocessor 700 is an 8-bit general purpose processor (Intel 8085) that provides a 16-bit address buss 702, an 8-bit data buss 704, and a control buss 706. The upper 8 bits of the address buss 702 are provided directly from the processor and the lower 8 bits are multiplexed from the data buss through a latch 708 (Intel 8212). The control buss 706 provides the interconnections between the processor 700 and the various support integrated circuits (IC's) on the computer board as well as the inter-IC control signal interconnections. The control signals include, e.g., read/write, address latch, interrupt, hold, clear, inhibit/enable, clock, and reset control signals; and input, output and memory management signals. The various busses, or portions thereof, are connected to the remaining integrated circuits on the computer board to provide address, data, and control signals thereto. The computer is interfaced with the inter-communication busses through a user configurable programmable peripheral interface 710 (Intel PPI 8155) which provides 256 bytes of static RAM (random access memory), a real-time delay, and a plurality of input/output lines which are configured to provide an input port 710a and an output port 710b, both ports of which are connected to a bidirectional buffer 712, and a control port 710c that is connected to a control buffer 741. The processor 700 interconnects through the address, data, and control busses with 8-bit read only memory (ROM) 716, eight bit held programmable read only memory 718 (PROM), an eight bit random access memory 719 and a 1-bit random access memory (RAM) 720. In the preferred embodiment of the computer, the ROM 716 and PROM 718 are mounted in DIP (dual in-line package) sockets and preferably provide between 1K and 8K of memory, and the RAMs 719 and 720 are hardwired in place.

The ROM 716 contains the monitor and master control program and the PROM 718, which functions as the patch panel memory of the system, specifies interconnections between selected logic functions of the applications system of the program and the controlled device. The RAM 720 contains the input and output flags of each of the logic functions used in the overall system. The RAM 719 is configured to contain a multiplicity of 16 bit registers, each performing the function of a time delay timer usable in the logic system to be selected by the user.

The decoders 722 and 724 are each one-of-eight decoders connected to the address buss and adapted to partially decode the address. The decoder 722 decodes the available 64K addresses into eight 8K-blocks with the output of this decoder used to provide various circuit enable signals, and the decoder 724 decodes the uppermost 8K address blocks decoded by the decoder 722 into eight 1K-blocks with the output of this decoder used to provide various on-board circuit enable signals.

The decoder 726 is also a one-of-eight decoder that operates with an address buffer 728 to further decode a selected block of addresses to provide enable signals for various of the input/output cards $I/O_{1,2}, \ldots I/O_{n-1}$, $I/O_n$ existing within the system and various other on-board circuits.

An eight-to-one multiplexer 730 and associated buffers 732a, b, c ... h allows the process 700 to determine the status of various 24 volt D.C. lines 734a, b, c, ... h at I/O input ports. The multiplexer 730 is enabled by an appropriate chip select and gates a selected input to the data buss for evaluation by the processor 700. Another multiplexer 736 and associated buffers 738a, b, c, ... h allows the processor to provide a 24 volt D.C. output on selected lines 740a, b, c, ... h at I/O output ports. As in the case of the multiplexer 730, the multiplexer 736 is enabled by an appropriate chip select signal and decodes a selected portion of the address buss to provide the 24 VDC output.

A decoder 742 and an associated latch 744 are provided to selectively enable a multi-LED display 746. The display is under software control and is used to provide an on-board indication of various program milestones. The decoder 742 also provides chip enable signals to two buffers 750 and 752 which are connected, repectively, to multi-digit DIP switches 754 and 756. These switches are user accessible and permit user selected information to be utilized by the master program.

In addition to the structure described above, the single board computer includes power regulation, over-voltage and over-current protection; power-up and power-down sequence controls; various resets; connectors for effecting the interface of the computer with various busses and peripheral devices, including expansion devices; and structure for effecting data accuracy checks, e.g. complement error detection circuitry.

The computer is adapted to interface with a variety of other I/O ports in the form of input/output circuit boards, each of which is designed to provide a particular set of control voltages and currents to various of the controlled devices. While these input/output boards are not specifically illustrated, representative input/output boards in accordance with the preferred embodiment include 8 channel multi-voltage (24 VDC, 48 VDC, 125 VDC, 120 VAC) cards; 8 channel 120 VAC cards; 8 channel 125 VDC cards; 8 channel lamp driver cards; 8 channel relay contact cards; various single and dual coil 120 VAC and 125 VDC drivers; and various serial and parallel data converters.

Figure 9:
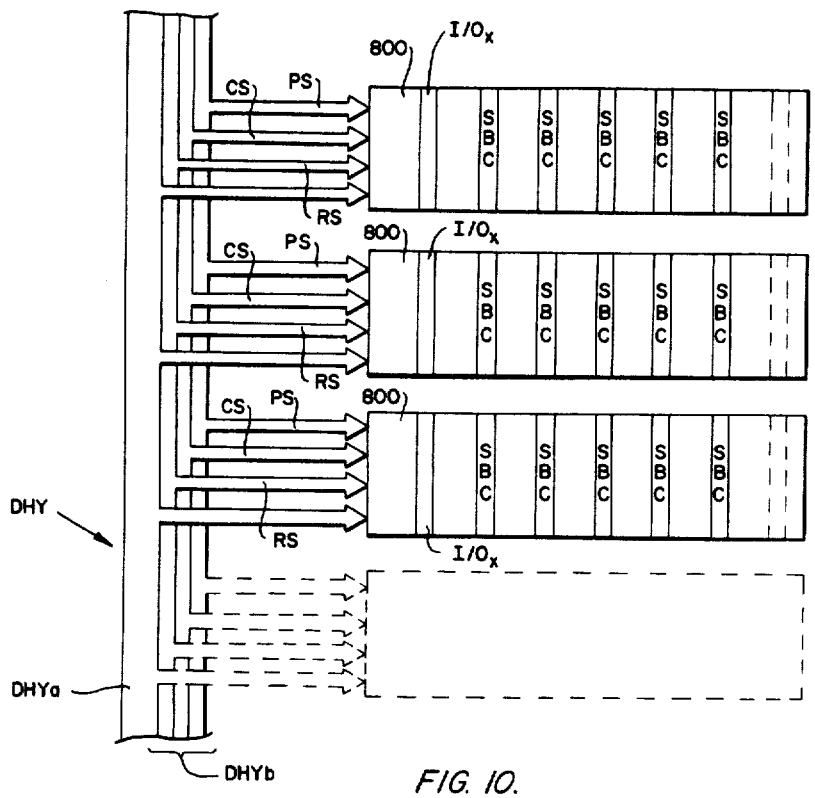
FIG. 9 represents the preferred physical arrangement of the single board computers of an industrial control system in accordance with the present invention.

The central, supervisory computer SC is connected to each single board computer SBC via the intercommunication buss DHY which includes (FIG. 9) an information or data portion $DHY_a$ and address portion $DHY_b$ that is used by the supervisory computer SC to sequentially address or poll each single board computer SBC in the system. As the supervisory computer SC polls each single board computer SBC, it monitors for malfunction and alarm indications at each polled computer and, in addition, can request information and data for record keeping purposes. In the preferred form, as shown in FIG. 9, the single board computers $SBC_{1,2}, \ldots n$ are mounted in conventional racks (not shown) with each rack containing a motherboard 800 that is designed to accommodate a predetermined number of single board computers SBC. Each rack also includes a signal expansion/buffer board $I/O_x$ that is used by the supervisory computer to assist in selecting a particular single board computer SBC.

The address portion of the intercommunication buss DHY is divided into three sub-busses, a rack select sub-buss RS, a card select sub-buss CS, and a point select sub-buss PS, that are connected to both the signal expansion/buffer board $I/O_x$ and the motherboard 800 of each rack. The rack select sub-buss RS is an eight line buss that provides a one-of-eight output decoded from the supervisory computer address buss, and the card select sub-buss CS is a four-line buss that provides a one-of-four output decided from the supervisory computer address buss. The point select sub-buss PS is a three-line uncoded binary output, also from the supervisory computer.

Figure 10:
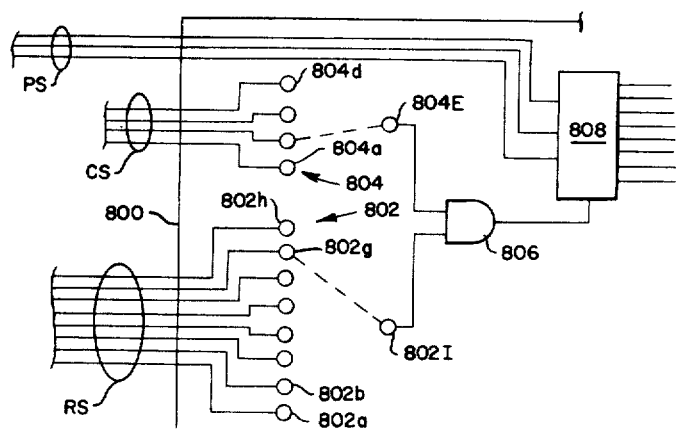
FIG. 10 represents a preferred addressing arrangement whereby a selected one of single board computers, arranged in accordance with the illustration of FIG. 9, is addressed by a supervisory computer.

As shown in FIG. 10, the rack select and card select sub-busses, RS and CS, each are connected, respectively, to "jumper pad" type terminations 802 and 804 located on the motherboard or, if preferred, another specially provided printed circuit board (not shown). The eight rack select lines each terminate at a pin $802_{a,b,c}, \ldots h$ and the four card select lines each terminate at a pin $804_{a,b,c}$ and $_d$. A pin $802_I$, located adjacent the pins $802_{a,b}, \ldots h$ and another pin $804_E$, located adjacent the pins $804_{a,b,c}$ and $_d$, are provided to permit a hard-wire jumper (broken-line illustration) to be connected between a selected line of the rack select sub-buss RS and the pin $802_I$ and another jumper (also shown in broken-line illustration) to be connected between the pin $804_E$ and a selected line of the card select sub-buss CS. The pins $802_I$ and $804_E$ are connected to the inputs of an AND gate 806 which provides an enable output when coincidence occurs between the jumper-selected rack select line and the jumper-selected card select line.

The point select sub-buss PS is connected to an eight-to-one decoder 808 which is located on the signal expansion/buffer board $I/O_x$ and recives its enable signal from the AND gate 806. When the jumper selected lines of the rack select and the card select sub-busses, RS and CS, to to a predetermined logic state (e.g., binary high or binary low), the decoder 808 is enabled to select a particular output line as determined by the point select sub-buss PS. These output lines, are, in turn, connected to the single board computers located in the selected rack and function to enable the single board computer addressed by the supervisory computer SC. As can be appreciated, the circuitry of FIG. 10 enables the central, supervisory computer SC to select one of several hundred single board computers.

Figure 11:
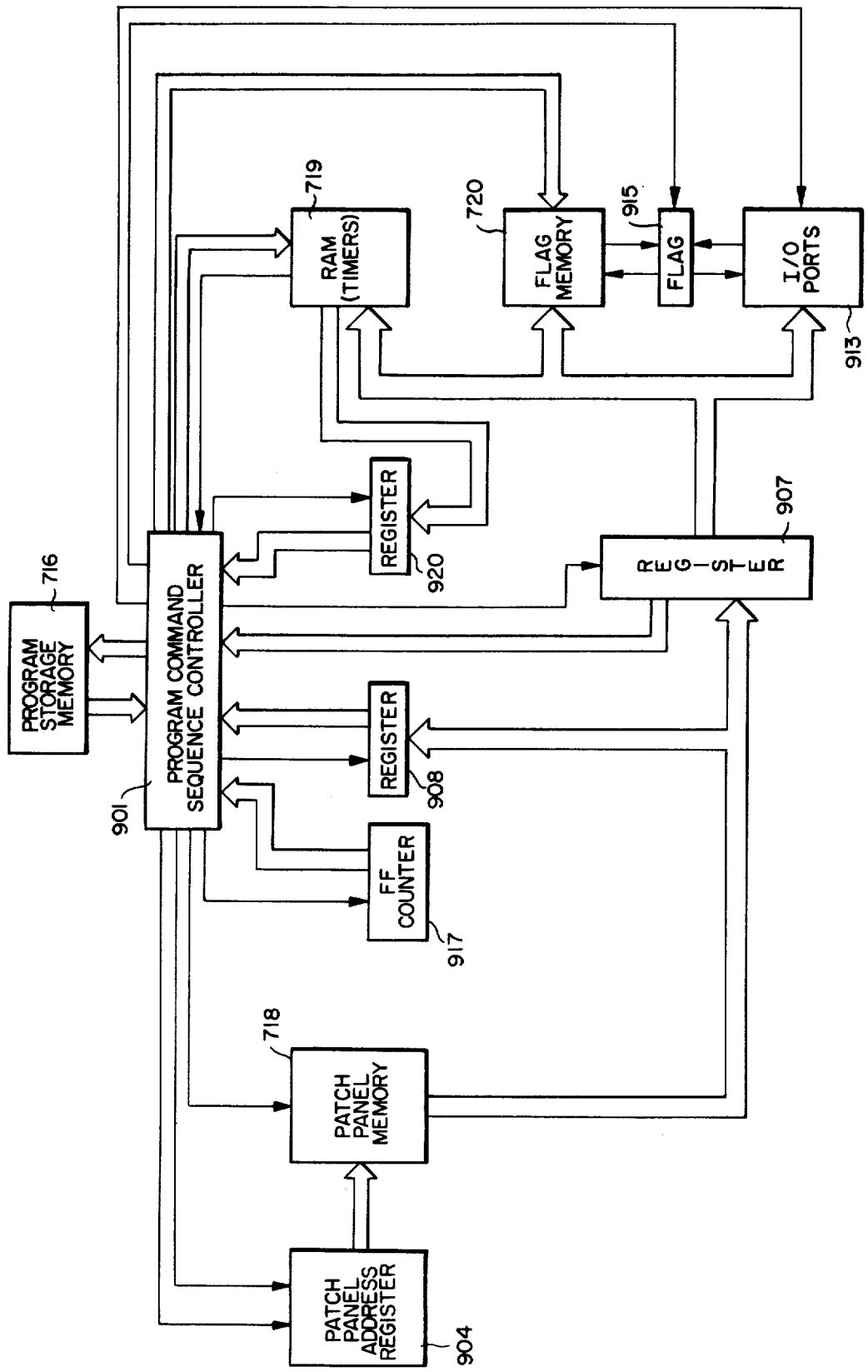
FIG. 11 is a functional block diagram illustrating the operation of each of the single board computers of the system of the present invention.

While the architecture of each single board computer $SBC_1$ through $SBC_9$ is illustrated in FIGS. 8a and 8b, the present invention can be better understood by reference to FIG. 11 which is a functional block diagram of how the system of FIGS. 8a and 8b is configured to operate in accordance with the present invention. As shown in FIG. 11, the system of the present invention is controlled by a command program sequence controller 901, which would be the instruction decoder and program counter of the microprocessor 700. The controller 901 obtains instructions in sequence from a program storage memory which is the ROM 716 of FIG. 8a with its stored program. The controller 901 is operable to read out addresses stored in the patch panel memory at locations selected by a patch panel address register 904. The patch panel memory is the PROM 718 of FIG. 8a and the patch panel address register 904 is an internal register in the microprocessor 700 configured to address the PROM 718 over the address bus 702 as shown in FIG. 8a.

Each patch panel memory location has a FROM section and a TO section, each of which are assigned a separate address with the address of the TO section being one increment greater than the address of the FROM section. When the controller 901 causes a word to be read out from the patch panel memory 718 at the location selected by the address register 904, it will be stored in a register 907 or a register 908, which are internal registers if the microprocessor 700 of FIG. 8a. The words stored in the FROM sections may be the addresses of storage locations from which the user desires to make a connection and the words stored in the TO sections will then be the addresses of storage locations to which the user desires to make the connections.

Alternatively, the words stored in a FROM section may be the address of a time delay timer in which case the numbers stored in the TO section will equal the time delay to be provided by the timer in tenths of a second. The time delay timers are 16 bit registers in the 8 bit RAM 719. The bits 0 through 13 of each timer are used to keep track of the elapsed time. Bit 14 of each timer is called the 'timed out bit' and is set to a one when the timer has timed out. Bit 15 of each timer is called the 'running bit' and is set to a one when the timer is running.

Each address in a FROM section or a TO section of the patch panel memory which is not the address of one of the timers in the RAM 719 will select a one bit signal or storage location, which may be one of the I/O ports 913 or may be the address of a flag in the flag memory. The flag memory is the one bit random access memory 720 of FIG. 8a and contains the logic input flags and logic output flags for the system logic. The controller 901 is operable to read out the bit stored in the storage location selected by the address stored in the register 907 and store this bit in a one bit register or flag 915, which is an internal flag of the microprocessor 700 in FIG. 8a. The program command sequence controller 901 is also operable to read out the bit in the flag 915 and store the bit at an I/O port 913 or set an input flag in the flag memory 720 at the address location selected by the address word in the register 907 in accordance with the bit read out from the flag 915.

If the storage location selected by the register 907 is an input flag of an AND gate in flag memory 720, the controller 901 will set the input flag to zero if the bit read out from the flag 915 is a zero and will leave the AND gate input flag unchanged if the bit read out from flag 915 is a one. If the storage location selected by the register 907 is the input flag of an OR gate in the flag memory 720, the controller 901 will set the OR gate input flag to one if the bit read out from the flag 915 is a one and will leave the OR gate input flag unchanged if the bit read out from the flag 915 is a zero. If the address location selected by the register 907 is the input flag of any logic function other than a simple AND gate or OR gate or is an I/O port output, the controller 901 will set the logic input flag or I/O port output to be the same as the bit read out from the flag 915. When the address stored in the register 907 is from a FROM section of the patch panel memory 903 and it is not the address of a time delay timer in RAM 719, the address will select either an I/O port input or an output flag in the flag memory 720 and the controller 901 will operate to read out the bit from the address location selected by the register 907 and store it in the flag 915. When the address word in register 907 is from a TO section in the patch panel memory 903, the address will select an I/O port output or an input flag in the flag memory 720 and the controller 901 will operate to read out the bit from the flag 915 and set the bit in the address location selected by the address stored in register 907 in accordance with the bit read out from the flag 915.

When the address read from the FROM section of the patch panel memory 718 and stored in the register 907 selects a timer in the RAM 719, the controller 901 will read out the the timer to register 920 and will read out the time delay value stored in the corresponding TO section in the patch panel memory 718 to the register 908. The controller 901 will then compare the values in the registers 908 and 920, and set the timed out bit of the timer to one if the value in register 920 equals or exceeds the value in register 908.

The controller 901 will increment each of the timers in RAM 918 which have their running bits set to one every tenth of a second. Each timer in RAM 918 has a corresponding input flag and output flag in the flag memory 720. When an address stored in the register 907 selects the input flag of a timer, the controller 901 will set the running bit of the timer in RAM 918 to one. Then, when the timer times out and the timed out bit is set to one, the controller 901 will set the output flag of the timer in flag memory 720 to one.

Figure 12A:
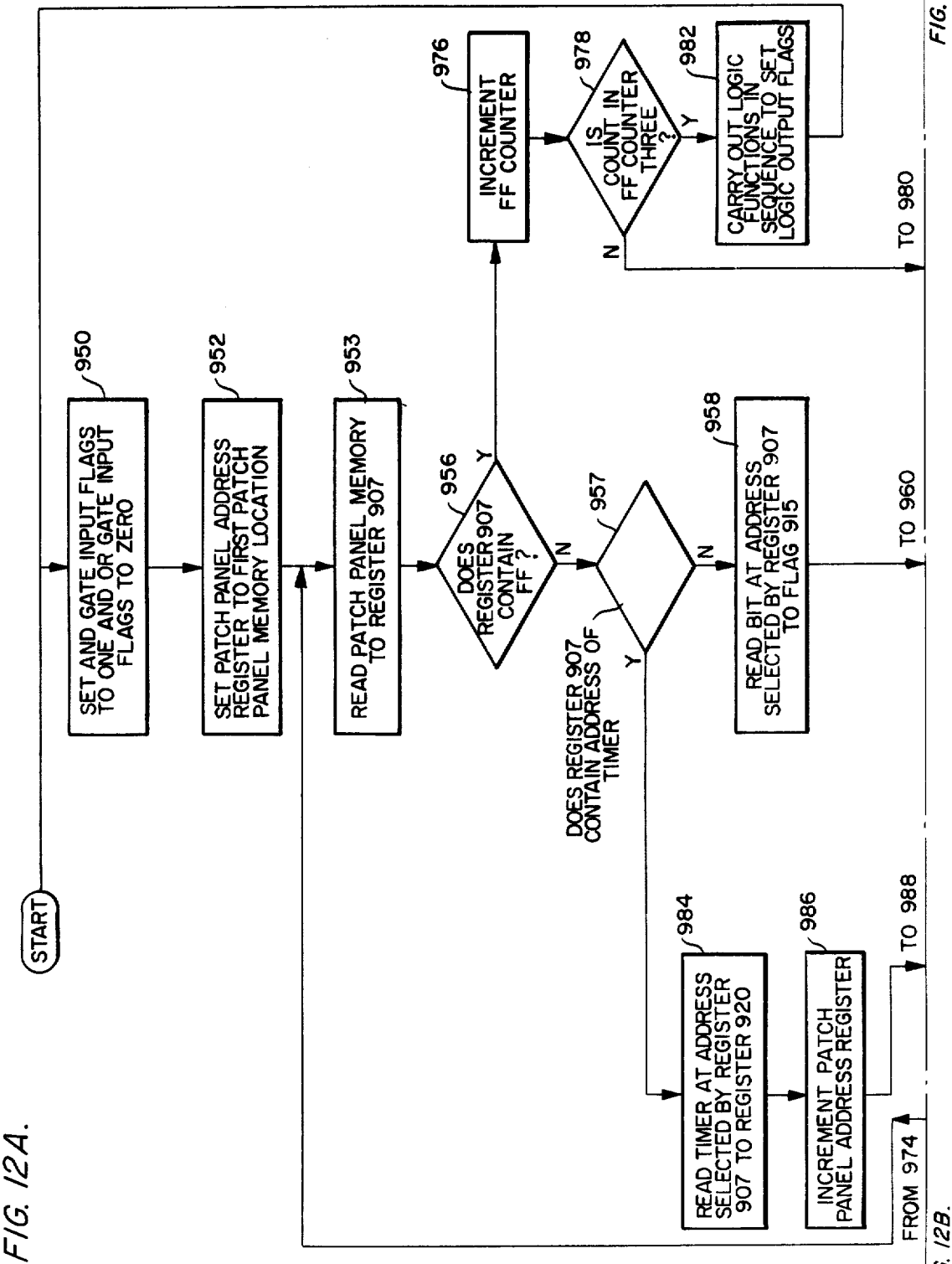

The operation of the system will now be described with respect to the functional block diagram illustrated in FIG. 11 in connection with the flow chart of the program instruction sequence illustrated in FIGS. 12a and 12b. The program, after passing through the monitor program (not shown in FIG. 12) enters the flow chart of FIG. 12 at the position labeled "START" and will enter instruction sequence 950. As stated above, each AND gate function will have a single input flag in the flag memory 720, which serves as the input flag for all of the inputs for such AND gate. Similarly, each OR gate function will have a single input flag in the flag memory 720, which will serve as the input flag for all of the inputs for such OR gate. In instruction sequence 950, the program command sequence controller 901 sets all of the AND gate input flags in the flag memory 720 to 1 and all of the OR gate input flags in the flag memory 720 to 0.

The program will then enter instruction sequence 952 in which the controller 901 sets the patch panel address register 904 to the lowest numbered address in the patch panel memory 718. This will be the address of the FROM section of the first patch panel memory location. After completing instruction sequence 952, the program moves into instruction sequence 953, in which the controller 901 reads out the address word from the patch panel memory location selected by the address register 904 to register 907. The user of the system will have previously loaded sequential memory locations in the patch panel memory 903 starting with the first patch panel memory location with data in the form of addresses he wants to interconnect and the addresses and time delays of selected timers in the RAM 719. In the one memory location of the patch panel memory, he may put the address of an I/O port input in the FROM section and the address of a logic input flag of flag memory 720 in the TO section indicating that he wants to connect the selected I/O port input to the selected logic input. In another memory location of the sequence in which he stores addresses, he may put the address of a logic output flag of flag memory 720 in the FROM register and the address of an I/O port output in the TO register indicating that he wants to connect the output of that logic function to that I/O port output. In still another memory location, he may place the address of the output flag of a first logic function in the FROM section and the address of an input flag of a second logic function in the TO section indicating that he wants the output of the first logic function connected to the input of the second logic function. He may also have loaded in the FROM section of some other memory locations the addresses of the time delay timers that he wishes to use in his system and will load in the corresponding TO sections the time delays in tenths of a second to be provided by the time delay timers in the logic system. For example, in one FROM section, he may load the address of a specific time delay timer in the RAM 719. Into the corresponding TO section, he may load 55 to represent a time delay of 5.5 seconds. These addresses selecting logic connections and data selecting time delays will be placed in a continuous sequence in memory location starting from the first memory location up through as many locations equalling the number of connections the user wants to make. The remaining memory locations in the patch panel memory will remain in their original condition, which is FF(HEX) meaning that the binary bits of these memory locations are all ones.

After the address word is read to the register 907 in instruction sequence 953, the program enters decision sequence 956 in which the controller 901 determines whether or not the address word in register 907 is FF(HEX). If the address word in address register 907 is not FF, this means that the program has not completed the reading out of the FROM and TO sections in which the user has stored addresses and, accordingly, the program proceeds to decision sequence 957.

In decision sequence 957, the controller 901 determines whether the address in register 907 is the address of a time delay timer in RAM 719. If it is not the address of the time delay timer in RAM 719, the program proceeds into instruction sequence 958. If the address in register 907 is not the address of a time delay timer in RAM 719, the address in register 907 will contain the address of an I/O port input or an output flag in the flag memory 720. In instruction sequence 958, the controller 901 reads the bit from the I/O port or output flag in the flag memory 720 at the address selected by the register 907 and stores this bit in flag 915. The program then proceeds to instruction sequence 960 in which the controller 901 increments the patch panel address register 904. The program then enters instruction sequence 961, in which the controller 901 reads out the location in the patch panel memory selected by the patch panel address register 904. Since the location read out in instruction sequence 953 was a FROM section and since the patch panel address register has been incremented by one, the location read out in instruction sequence 961 will be a TO section. The address read from the TO section will be stored in the register 907 and the program then enters decision sequence 962.

In decision sequence 962, the controller 901 examines the address in the register 907 to determine whether it contains the address of an AND gate input flag. If it does contain the address of an AND gate input flag, the program branches to instruction sequence 964, in which the controller sets the flag in the flag memory 720 selected by the address in the registers 907 to a zero if the flag 915 is a zero. If the flag 915 is a one, the controller 901 leaves the AND gate input flag unchanged. Following completion of instruction sequence 964, the program proceeds into instruction sequence 966.

If in the decision sequence 962, the controller 901 determines that the address in register 907 is not the address of an AND gate input flag, the program proceeds into decision sequence 968, in which the controller 901 examines the address in the register 907 to determine whether it is the address of an OR gate input flag. If the address in register 907 is the address of an input flag for an OR gate, the program branches into instruction sequence 970, in which the controller 901 will set the OR gate input flag in the memory 720 selected by the address in the register 907 to a one if the flag 915 is a one. If the flag 915 is a zero, the controller 901 will leave the OR gate input flag unchanged. Following completion of the instruction sequence 970, the program will enter instruction sequence 966.

If the controller 901 determines in decision sequence 968 that the address in register 907 is not the address of the input flag of an OR gate, the program proceeds into instruction sequence 972 in which the controller 901 sets the bit at the address location selected by the address in register 907 to be the same as the bit in flag 915. In this manner, the logic input flag selected by the register 907 or the output at the I/O port selected by the register 907 will be set to correspond with the flag 915.

If in decision sequence 957, the controller 901 determines that the address in register 907 is the address of a timer in RAM 719, the program branches to instruction sequence 984, in which the controller 901 reads the timer register in the RAM 719 at the address selected by the register 907 to the register 920. The information read out will contain the elapsed time as well as the status of the timed out and running bits of the timer. The program then enters instruction sequence 986 in which the controller 901 increments the patch panel address register 904 and then the program enters instruction sequence 988. In instruction sequence 988, the controller reads the patch panel memory at the address selected by the register 904 to the register 908. The address selected in the patch panel memory 918 will be the TO section corresponding to the FROM section data presently contained in register 907 and, thus, will contain the time delay selected by the user for the timer, the address of which is contained in register 907.

After instruction sequence 988, the program enters into decision sequence 990 in which the controller 901 compares the values in bits 0 through 13 of register 920 with the value in register 908. If the value in register 920 is less than the value in register 908, this will mean that the elapsed time in the timer has not reached the value of the time delay selected for that timer and the program will then proceed into instruction sequence 966.

If the value in bits 0 through 13 in register 920 is equal to or greater than the time delay value in register 908, the program will branch into instruction sequence 992 in which the program will set to one the timed out bit of the timer, the address of which will still be contained in register 907.

When the program enters instruction sequence 966, it will set a counter 917, referred to as the FF counter, to zero. The counter 917, which is an internal register in the microprocessor 700 of FIG. 8a, is used to make a positive determination as to whether or not the program has completed reading out all of the patch panel memory locations in which the user has stored addresses in the manner to be explained below.

After completing instruction sequence 966, the program enters instruction sequence 974 in which it causes the controller to increment the patch panel address register 904 and the program then proceeds back into instruction sequence 953. At this point, the program repeats itself in the same manner as described. However, in this sequence, because of the incrementation of the patch panel address register, the program will be reading out the FROM and TO sections of the patch panel memory in the second memory location. The program will then continue to recycle through this program portion called the patch panel set of instructions until all of the memory locations of the patch panel memory in which the user has stored addresses and time delay data have been read out and acted upon.

After the last memory location containing addresses or time delay data has been read out and acted upon, the next time the program enters instruction sequence 953, it will read out FF(HEX) from the patch panel memory into the register 907 since this is the original state of the patch panel memory locations. Accordingly, when the program enters decision sequence 956, it will determine that the register 907 contains FF(HEX) and the program will branch into instruction sequence 976 in which the program will cause the controller 901 to increment the FF counter 917. The purpose of the FF counter is to ensure that the patch panel portion of the program has completed the reading out of all of the locations in which the user has stored addresses or time delay data and to branch out of the patch panel portion of the memory only upon FF(HEX) being read out of the FROM sections of three successive patch panel locations. The program, after completing instruction sequence 976, enters decision sequence 978, in which the controller 901 determines whether the count in the FF counter is 3. If the count in the FF counter is not 3, the program branches into instruction sequence 980, in which the controller 901 increments the patch panel address register, whereupon the program proceeds into instruction sequence 974 in which controller 901 again increments the patch panel address register. The program then cycles back to instruction sequence 953, in which the controller 901 will read out the FROM section of the next memory location. Because of the incrementing of the patch panel address register in instruction sequence 980 as well as in instruction sequence 974, the program will skip reading the next TO section in the patch panel memory.

After reading out the FROM section in the next sequential patch panel memory location, the program sequence enters decision sequence 956 and the controller 901 again determines whether the register 907 contains FF. If it does, the program again branches into instruction sequence 976 in which the controller 901 again increments the FF counter. This process repeats until the count in the FF counter 917 reaches 3 whereupon this condition will be detected by the controller 901 in decision sequence 978 and the program will branch into the instruction sequence 982, which is the applications set of instructions of the program. The use of the FF counter thus keeps the program from branching into the applications set of instructions until the program has caused the controller 901 to find three patch panel memory locations in a row in which the FROM section contains FF(HEX). In this manner, it is ensured that all of the memory locations of the patch panel memory containing addresses or time delay data are read out. Also, this feature permits the user to remove existing logic connections represented by addresses in the TO and FROM sections of memory locations in the patch panel memory. The user removes the connections by entering FF(HEX) in the appropriate TO and FROM sections. Thus, when the program reads out FF(HEX) from the FROM section of such a memory location, it will not immediately branch into the applications set of instructions, but will cycle back into the patch panel portion and read out the next memory location and continue on as before if the next memory location or the one after that contains an address in the FROM section.

By reason of the instruction sequence 966 in which the FF counter is set to zero, the program will cause the controller to skip over any number of memory locations in the patch panel memory having FF(HEX) in its FROM section as long as this number does not exceed two such memory locations in a row.

In the applications set of instructions in instruction sequence 982, the program goes through each possible logic function which might be used by the user of the system and to which he may direct input or output connections from the patch panel memory. These logic functions will include all of the logic functions to carry out control of all of the control devices of the system, and, thus will contain the logic to make the logic connections illustrated in each of FIGS. 2-7, for example. The logic functions include a multiplicity of OR gates, AND gates, delays, flashers, latches, and any other logic function which might be needed by the system in whatever duplication might be needed in the system. Each of the logic functions will have an input flag in the flag memory 911. In the case of each AND gate or OR gate, the applications program merely sets the output flag to be the same as the state of the input flag. In the case of each other logic function, the applications program sets the output flag is dictated by the particular logic function in accordance with data in the input flag or flags for that logic function. In the case of a flasher, the controller 901 will set the output flag to alternate between one and zero for preset time intervals in response to the input flag being a one. In the case of a latch, the controller 901 will set the output flag to a one when one input flag of the latch changes to one and then will reset the output flag back to zero when a second input flag thereof changes to one. As pointed out above, each time delay timer in RAM 719 will have an input flag and an output flag in flag memory 720. When the input flag of a time delay has been set to one, the applications program will cause the controller 901 to set the running bit of the corresponding time delay timer in RAM 719 to one if it has not already been so set.

In this manner, each time delay timer will have its running bit set to one in the applications program portion of the program whenever the input flag of the time delay timer has been set to one in the patch panel portion of the program. In addition, the applications program will cause the controller 901 to examine the state of the timed out bit of each timer, the input flag of which is one, and, if the timed out bit has been set to one, the controller 901 will set the output flag of the time delay to one. In this manner, each time delay output bit will be set to one at the preselected time delay after the input flag of such time delay has been set to one. In addition, if the input flag of the time delay is zero, the applications program will cause the controller 901 to set the elapsed time of the corresponding timer in RAM 719 to zero and will set the running bit and the timed out bit to zero. In this manner, the state of each timer is set to zero and in a nonrunning state in response to the input flag to the timer being zero. In the applications program, the controller 901 thus carries out the function of setting each time delay output flag to one, a preselected time delay after the input flag is set to one and the preselected time delay will be the value placed in the TO section, the corresponding FROM section of which contains the address of the timer. If either the input flag of a time delay is zero or the running bit of the time delay timer is zero, the applications program will cause the controller 901 to set the output flag of the time delay to zero.

After the output flag of every logic function of the system has been set, whether or not the user has directed connections to or from such logic functions in the patch panel memory, the program will proceed from the instructions sequence 982 back into instruction sequence 950 in which the controller 901 again sets the AND gate input flags to one and the OR gate input flags to zero. The program then proceeds into instruction sequence 952 where the controller 901 sets the patch panel address register to the first patch panel memory location. The program again enters the patch panel set of instructions and the process repeats. After cycling through the patch panel set of instructions and the applications portion of a program several times, each I/O port output of the system will be set in accordance with the logic and circuit connections directed by the user in the patch panel memory. The number of times that the program must cycle through the applications portion of a program depends on the number of logic stages in the logic system. Because of the speed of the program is cycling through the program instructions, each logic output port will respond to the changes in input signals and in accordance with the logic as directed to be connected by the user within a few milliseconds.

With the system described above, the user of the system can construct any desired logic system to control the setting of binary bits at output ports in response to the binary bits applied to input ports and the on/off and other binary functions will be controlled in accordance with the setting of the binary bits at the output ports. The construction is carried out simply by placing the appropriate addresses, directing the connections in the FROM and TO registers of the patch panel memory. If the logic system employs a time delay, the user must also put the address of a time delay timer in one of the FROM sections and the selected delay for the time delay in the corresponding TO section. In this manner, any of the logic systems described in FIGS. 2-7 can be provided or any other equivalent logic system may be provided. In addition, the user can make changes to each logic system as represented by the information stored in the patch panel memory of each single board computer. Thus, the present invention provides an industrial control system which can be readily conformed to the user's needs to carry out each control function in the industrial control process in accordance with the user's needs.

What is claimed is:

1. A computer system for setting a plurality of output signals in accordance with input data and logic functions operating upon said data in accordance with interconnections directed by the user of said computer system comprising:

a first memory having a set of logic input locations for storing input data and a set of logic output locations to store output data, program storage means containing program instructions including an applications set of instructions and a patch panel set of instructions, computer means to obtain and execute said instructions in a repeated program sequence alternately cycling through said patch panel set of instructions and said applications set of instructions, said applications set of instructions causing said computer means to carry out a multiplicity of logic functions on the data stored in said logic input locations and to store data in said logic output locations in accordance with said data in said logic input locations and the logic functions performed on the data in said logic input locations, each of said logic functions having at least one input location assigned exclusively thereto and one logic output location assigned exclusively thereto, a plurality of I/O ports for receiving input data and for storing output data to set output conditions at said I/O ports, a patch panel memory having a plurality of memory locations, each memory location having a FROM section and a TO section adapted to store addresses of said I/O ports, said logic input locations, and said logic output locations, whereby the user of the system can specify connections by the addresses stored in said patch panel memory from said I/O ports to the inputs of said logic functions, from the outputs of said logic functions to said I/O ports, and from the output of said logic functions to the inputs of said logic functions, said patch panel set of instructions causing said computer means to read out the addresses stored in sequential memory locations of said patch panel memory in sequence and to read the data selected by the addresses stored in the FROM sections and to store data in accordance therewith at the addresses selected by the corresponding T0 sections; whereby said computer means by alternately cycling through said patch panel set of instructions and said applications set of instructions will perform logic functions on the input data at said I/O ports in accordance with the interconnections of said logic functions specified by the user in said patch panel memory and store data at said I/O ports in accordance with the logic functions performed on said input data.

2. A computer system as recited in claim 1, wherein a plurality of said logic functions are AND gates, each of which has a single input flag as its sole logic input location, said program including a set of instructions to cause said computer means to set a one at the input flag at each of said AND gates prior to each time said computer means begins execution of said patch panel set of instructions and after said computer means completes execution of said applications set of instructions, set patch panel set of instructions causing said computer means to set to zero the input flag of each AND gate selected by an address read from a TO section of said patch panel memory if the address in the corresponding FROM section in said patch panel memory selects a storage location containing zero and to leave the input flag of such AND gate unchanged if the address in the corresponding FROM section selects a storage location containing one.

3. A computer system as recited in claim 1, wherein a plurality of said logic functions are OR gates each having a single input flag as its sole logic input location, said program including a set of instructions to cause said computer means to set a zero in the input flag of each of said OR gates prior to each time said computer means begins execution of said patch panel set of instructions and after said computer means completes execution of said applications set of instructions, said patch panel set of instructions causing said computer means to set to one the input flag of each OR gate selected by an address read from a TO section of said patch panel memory if the address in the corresponding FROM section in said patch panel memory selects a storage location containing a one and to leave the input flag of such OR gate unchanged if the address in the corresponding FROM section selects a storage location containing a zero.

4. A computer system as recited in claim 1, wherein a plurality of said logic functions are OR and AND gates each having a single input flag as its sole logic input location, said program including a set of instructions to cause said computer means to set a one in the input flag of each of said AND gates and a zero in the input flag of each of said OR gates prior to each time said computer means begins execution of said patch panel set of instructions and after said computer means completes execution of said applications set of instructions, set patch panel set of instructions causing said computer means to set to zero the input flag of each AND gate selected by an address read from a TO section of said patch panel memory if the address in the corresponding FROM section in said patch panel memory selects a storage location containing zero, and to leave the input flag of such AND gate unchanged if the address in the corresponding FROM section selects a storage location containing one, and causing said computer means to set to one the input flag of each OR gate selected by an address read from a TO section of said patch panel memory if the address in corresponding FROM selection in said patch panel memory selects the address of a storage location containing a one and to leave the input flag of such OR gate unchanged if the address in the corresponding FROM section selects a storage location containing a zero, said patch panel set of instructions causing said computer means upon reading out of the TO section of said patch panel memory the address of a logic input location which is not the input flag of a simple AND gate or a simple OR gate to store at such memory location the data read out from the address selected by the corresponding FROM section in said patch panel memory.

5. A computer system as recited in claim 1, wherein each of said logic input locations in said first memory and each of said logic output locations in said first memory separately selectable by addresses stored in said patch panel memory are flags, each capable of storing one bit of data and each of said I/O ports separately selectable by addresses stored in said patch panel memory is operable to receive or store one bit of data.

6. A computer system as recited in claim 1 operative as an industrial control system which includes a plurality of control devices connected to some of said I/O ports and controlled in accordance with the data stored at such I/O ports and including means to apply input signals to said I/O ports in accordance with operating conditions of said industrial control system.

7. A computer system as recited in claim 6, wherein there is means to apply an input signal to one of said I/O ports in accordance with the condition of a manual operable control means.

8. A distributed control system for controlling a plurality of control devices comprising:
 a plurality of control computers each connected respectively to individual ones of a plurality of control devices for providing control thereto, each of said control devices connected to its respective control computer through I/O ports;
 said computers being connected to one another and to a central supervisory computer through a data highway, said supervisory computer being operable to selectively monitor the function of each of said control computers,
 each of said control computers having:
 a first memory having a set of logic input locations for storing input data and a set of logic output locations to store output data,
 program storage means containing program instructions including an applications set of instructions and a patch panel set of instructions,
 a patch panel memory having a plurality of memory locations, each memory location having a FROM section and a TO section adapted to store addresses of said I/O ports, said logic input locations and said logic output locations, and
 computer means to obtain and execute said instructions in a program sequence alternately cycling through said patch panel set of instructions and said applications set of instructions,
 said applications set of instructions causing said computer means to carry out logic functions on the data stored in said logic input locations and to store data in said logic output locations in accordance with the data in said logic input locations and the logic functions performed on the data in said logic input locations, each of said logic functions having at least one logic input location assigned exclusively thereto and one logic output location assigned exclusively thereto, said patch panel set of instructions causing said computer means to read out the addresses stored in sequential memory locations of said patch panel memory in sequence and to read the data selected by the address stored in said FROM sections and to store data in accordance therewith at the addresses selected by the corresponding TO sections;

the applications set of instructions in the program storage means of each control computer causing the computer means of said control computer to carry out all of the logic functions necessary to effect control of each of the control devices connected to the I/O ports of all of said control computers, whereby the computer means of each of said control computers by alternately cycling through said patch panel set of instructions and said applications set of instructions will perform logic on the input data at the I/O ports of such control computer in accordance with the interconnections of said logic functions specified by the user in the patch panel memory of such control computer and control said control devices connected to said I/O ports in accordance with the logic functions performed on said input data.

* * * * *